United States Patent [19]

Wu et al.

[11] Patent Number: 6,049,404
[45] Date of Patent: *Apr. 11, 2000

[54] N+M DIGITALLY PROGRAMMABLE OPTICAL ROUTING SWITCH

[75] Inventors: Kuang-Yi Wu; Jian-Yu Liu, both of Boulder, Colo.

[73] Assignee: Macro-Vision Communications Inc., Boulder, Colo.

[*] Notice: This patent is subject to a terminal disclaimer.

[21] Appl. No.: 09/063,611

[22] Filed: Apr. 21, 1998

Related U.S. Application Data

[63] Continuation-in-part of application No. 08/979,525, Nov. 26, 1997
[60] Provisional application No. 60/042,575, Apr. 2, 1997.
[51] Int. Cl.⁷ ............................................. H04B 10/00
[52] U.S. Cl. ................................. 359/117; 359/139
[58] Field of Search ........................... 359/117, 122, 359/128, 139, 156, 352, 495, 479

[56] References Cited

U.S. PATENT DOCUMENTS

| | | |
|---|---|---|
| 4,650,289 | 3/1987 | Kuwahara . |
| 4,720,171 | 1/1988 | Baker . |
| 4,989,941 | 2/1991 | Soref . |
| 5,013,140 | 5/1991 | Healey et al. . |
| 5,162,944 | 11/1992 | Yamamoto . |
| 5,204,771 | 4/1993 | Koga ................................ 359/281 |
| 5,317,658 | 5/1994 | Bergland et al. . |
| 5,363,228 | 11/1994 | DeJule et al. . |
| 5,381,250 | 1/1995 | Meadows . |
| 5,414,540 | 5/1995 | Patel et al. . |
| 5,414,541 | 5/1995 | Patel et al. ........................ 359/39 |
| 5,615,104 | 3/1997 | Weverka . |
| 5,694,233 | 12/1997 | Wu et al. ......................... 359/117 |
| 5,724,165 | 3/1998 | Wu .................................. 359/117 |
| 5,771,120 | 6/1998 | Bergmann ....................... 359/484 |

*Primary Examiner*—Leslie Pascal
*Attorney, Agent, or Firm*—Dorr, Carson, Sloan & Birney, P.C.

[57] ABSTRACT

An optical routing switch provides polarization-independent and low-crosstalk switching between any of a plurality of input ports and any of a plurality of output ports over a wide operating range of temperatures and wavelengths. Optical signals appearing at each input port are spatially decomposed into two orthogonally-polarized beams by a first polarization-dependent routing element (e.g., a birefringent element or polarized beamsplitter). Beyond this point, a network of optical switches are placed along the optical paths of the pair of light beams. Each optical switch includes: (1) a polarization rotator that switchably controls the polarization of the input light beams so that both of the emergent beams are either vertically or horizontally polarized, according to the control state of the device; and (2) a polarization-dependent routing element that spatially routes the light beam pair to provide physical displacement based on their state of polarization. The final stage for each output port in the network consists of an array of polarization rotators that changes the polarization of at least one of the light beams, so that the two beams become orthogonally polarized. Finally, a polarization-dependent routing element (e.g., a birefringent element) intercepts the two orthogonally-polarized beams and recombines them to exit at the selected output port.

7 Claims, 38 Drawing Sheets

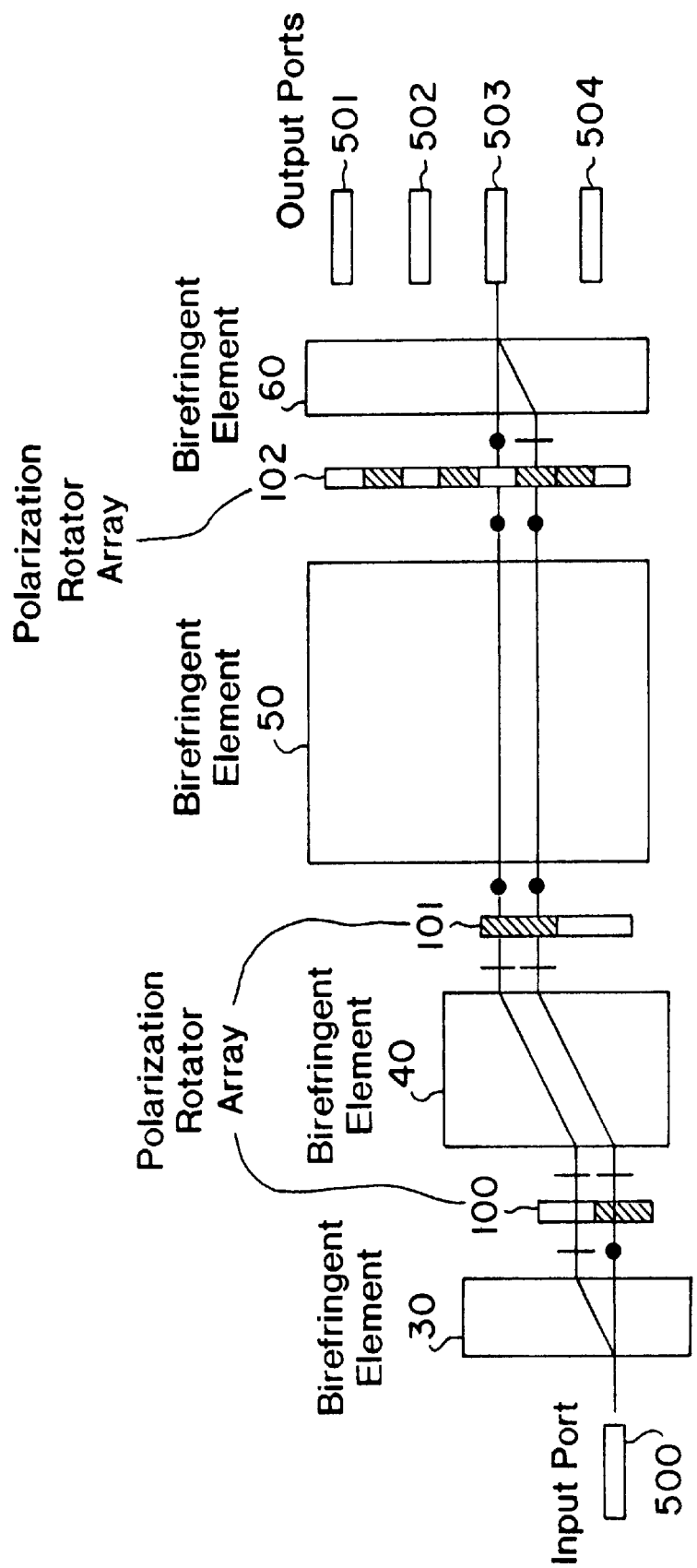

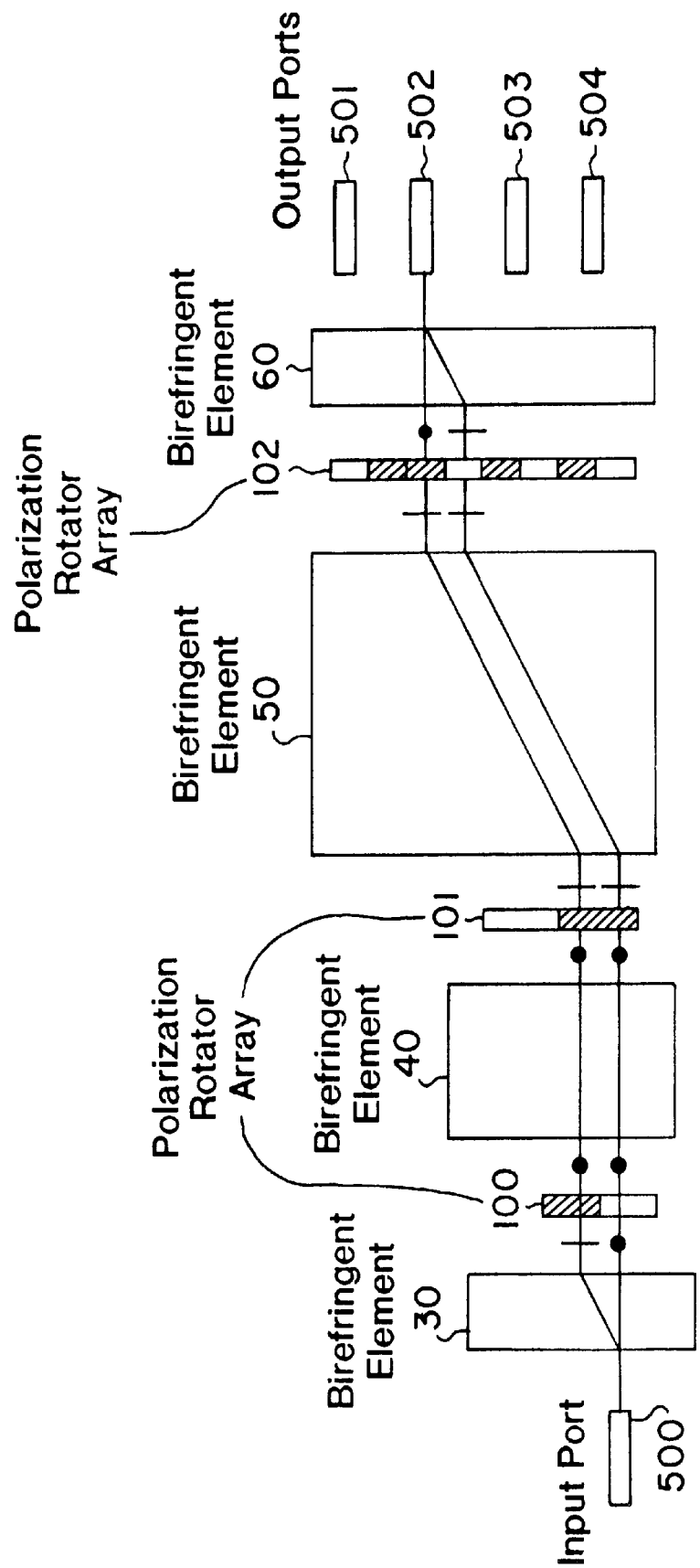

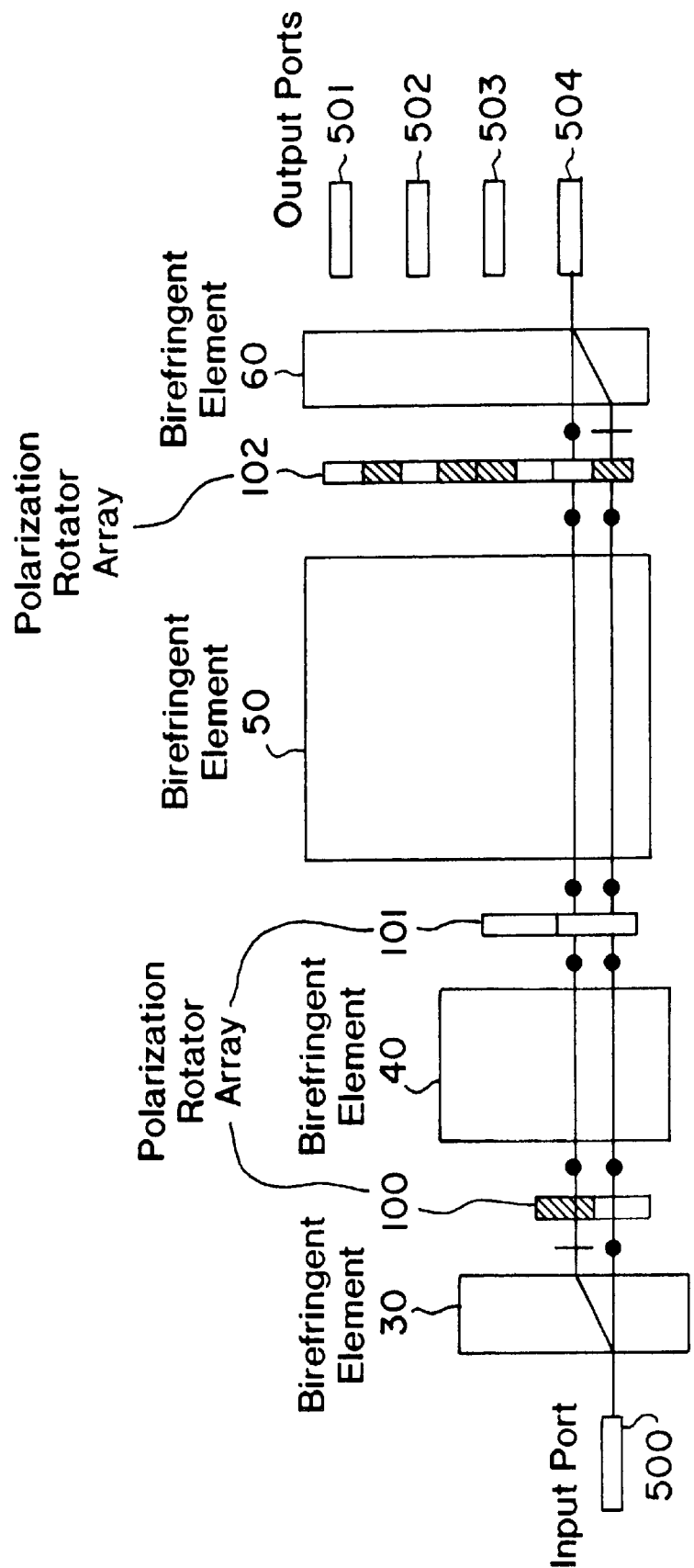

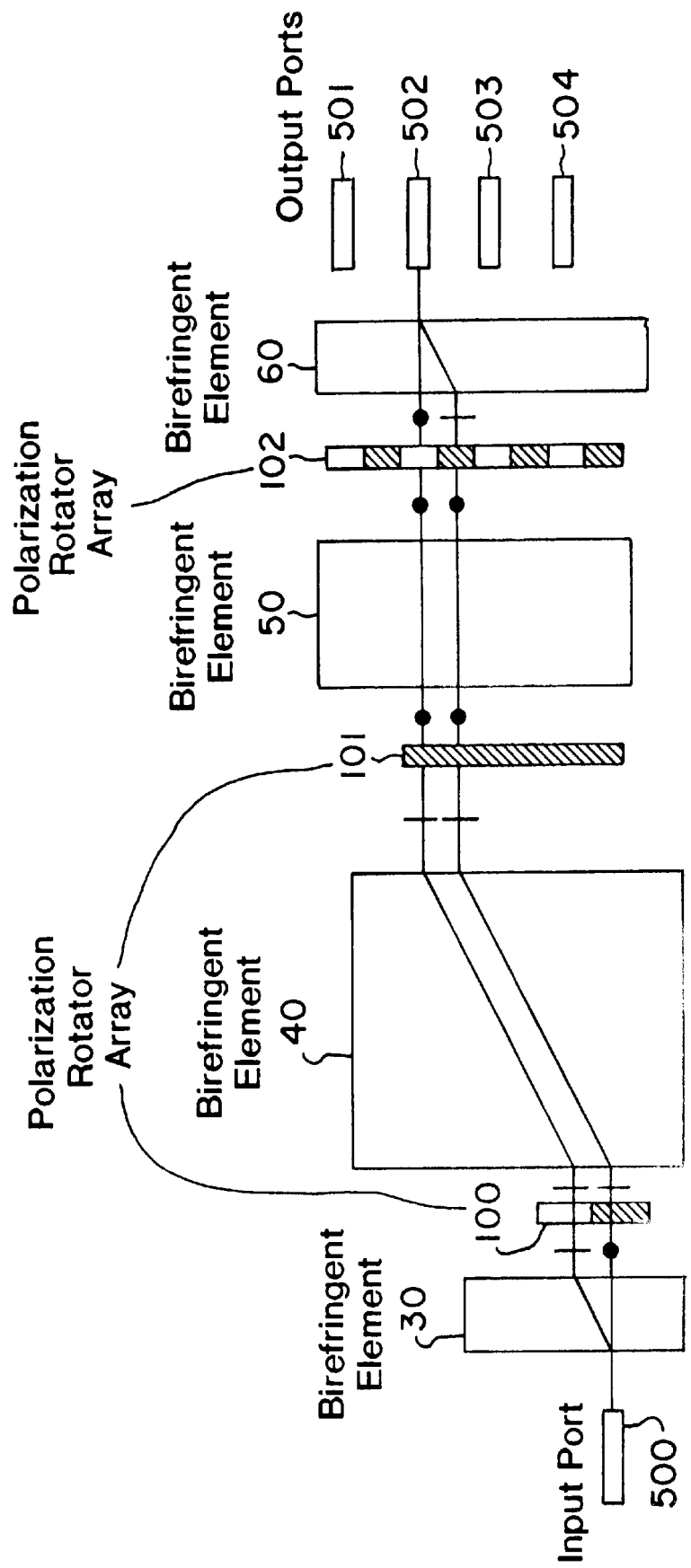

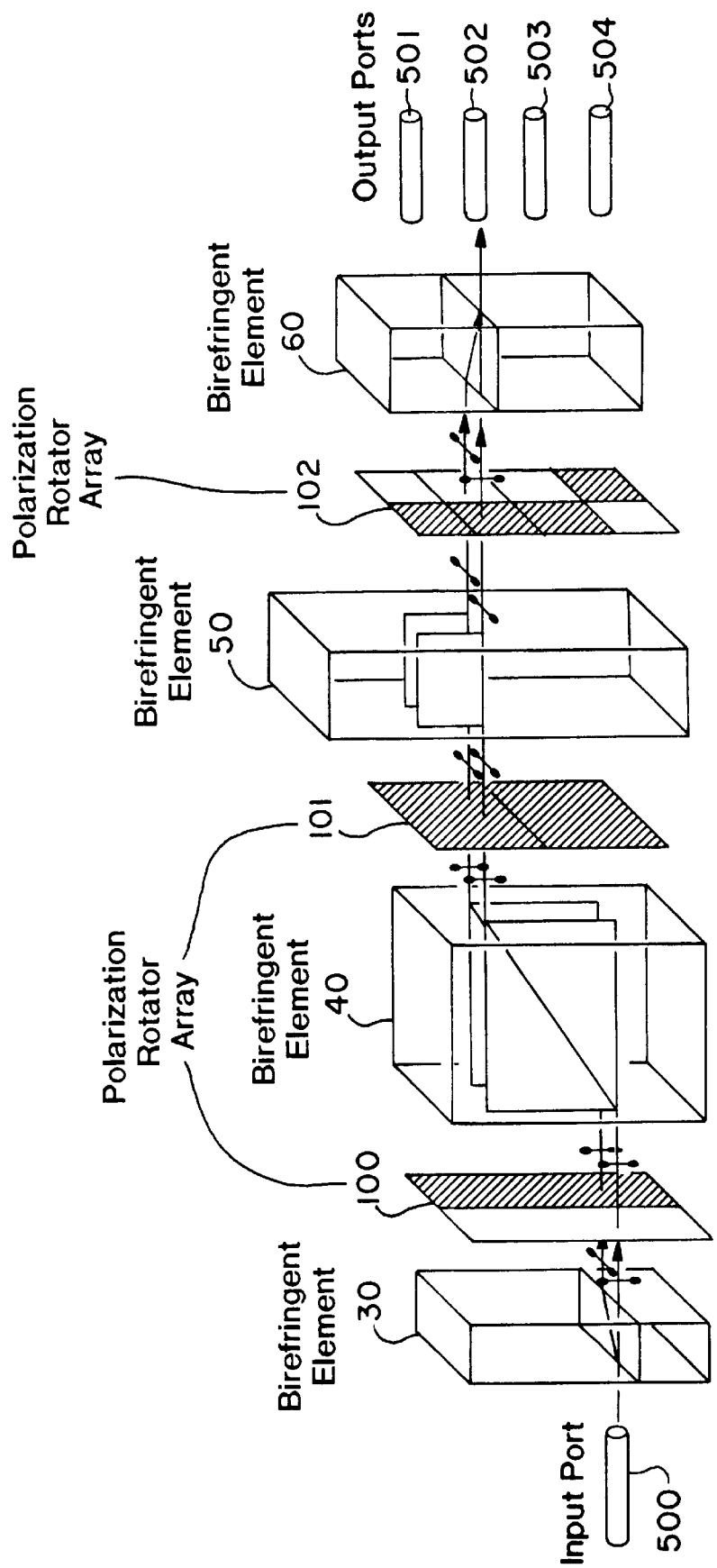

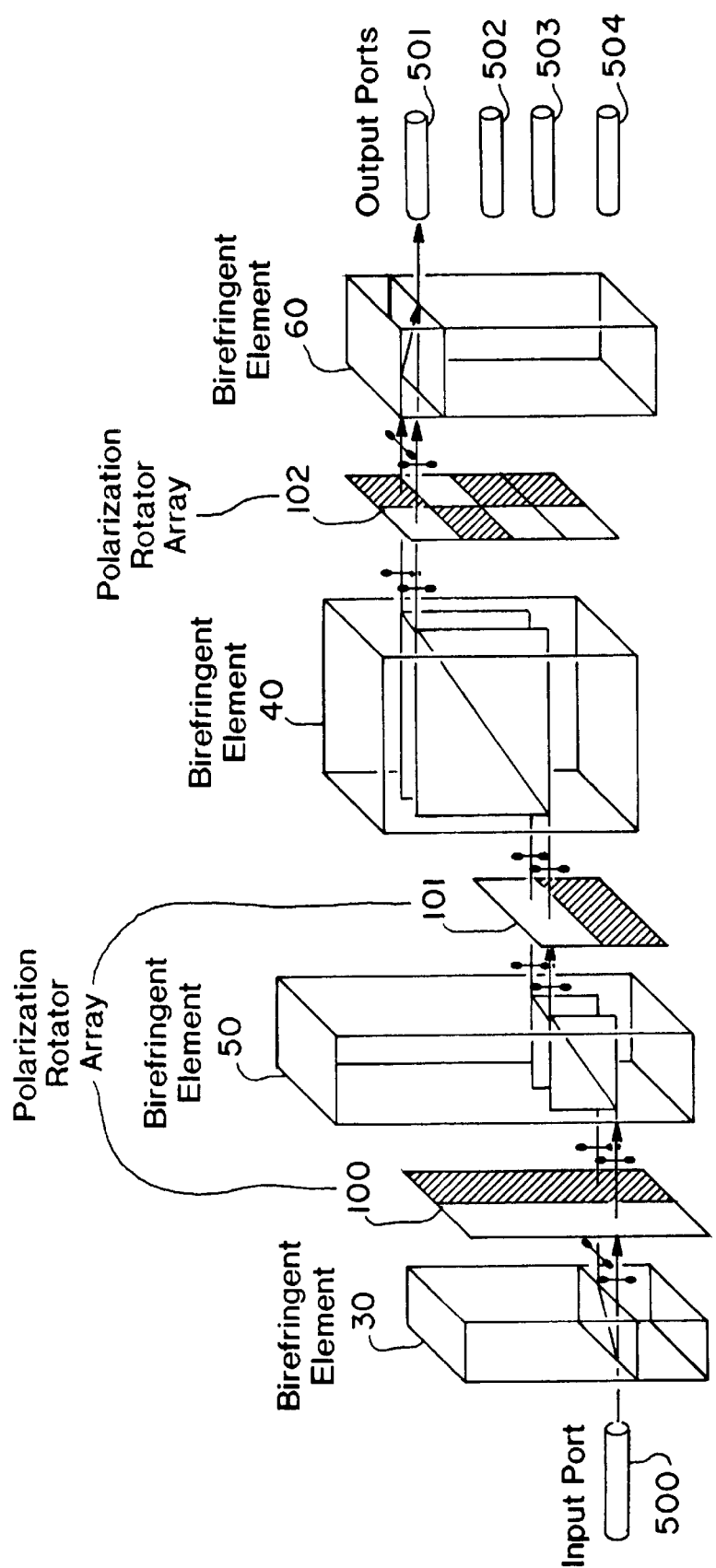

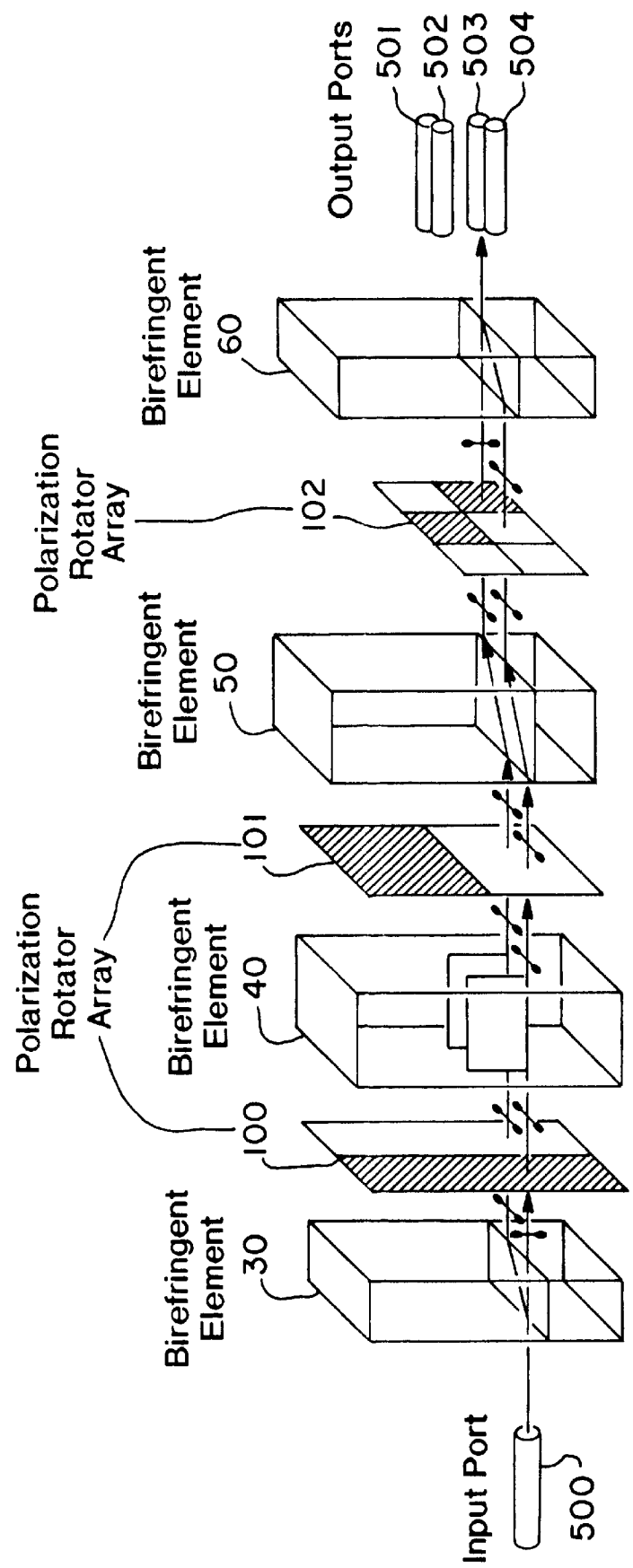

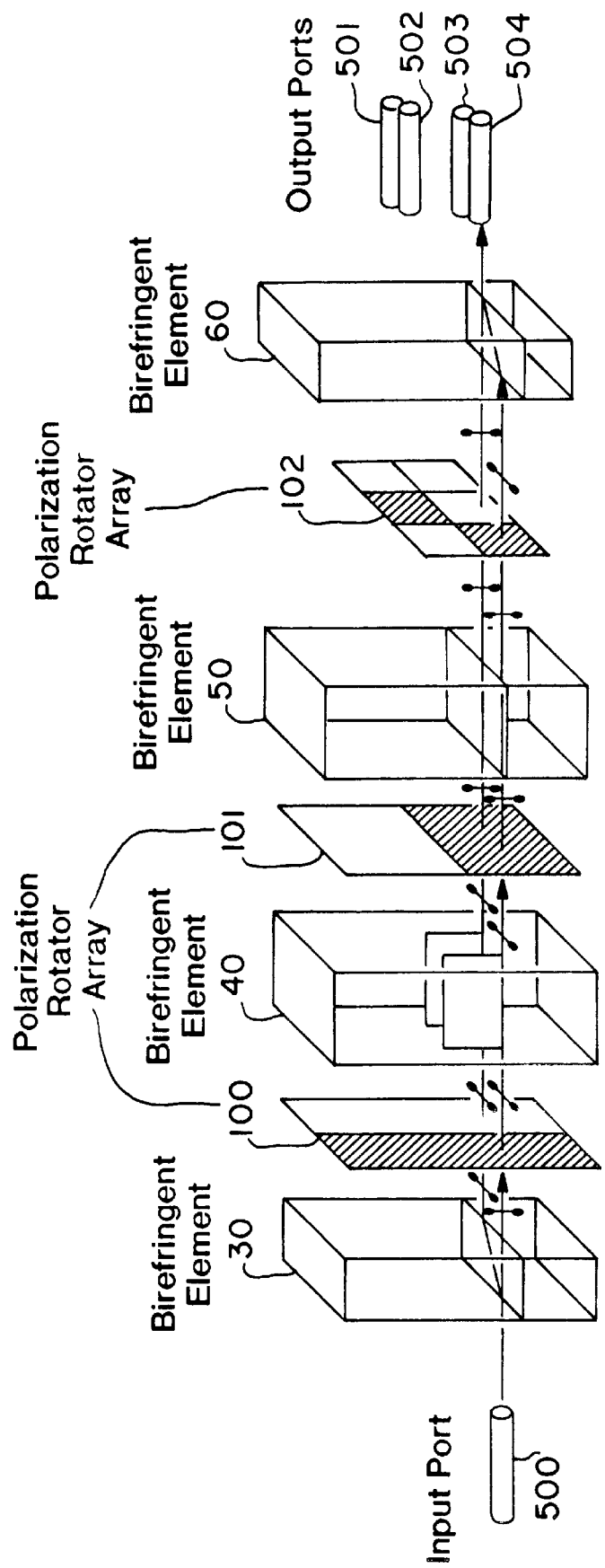

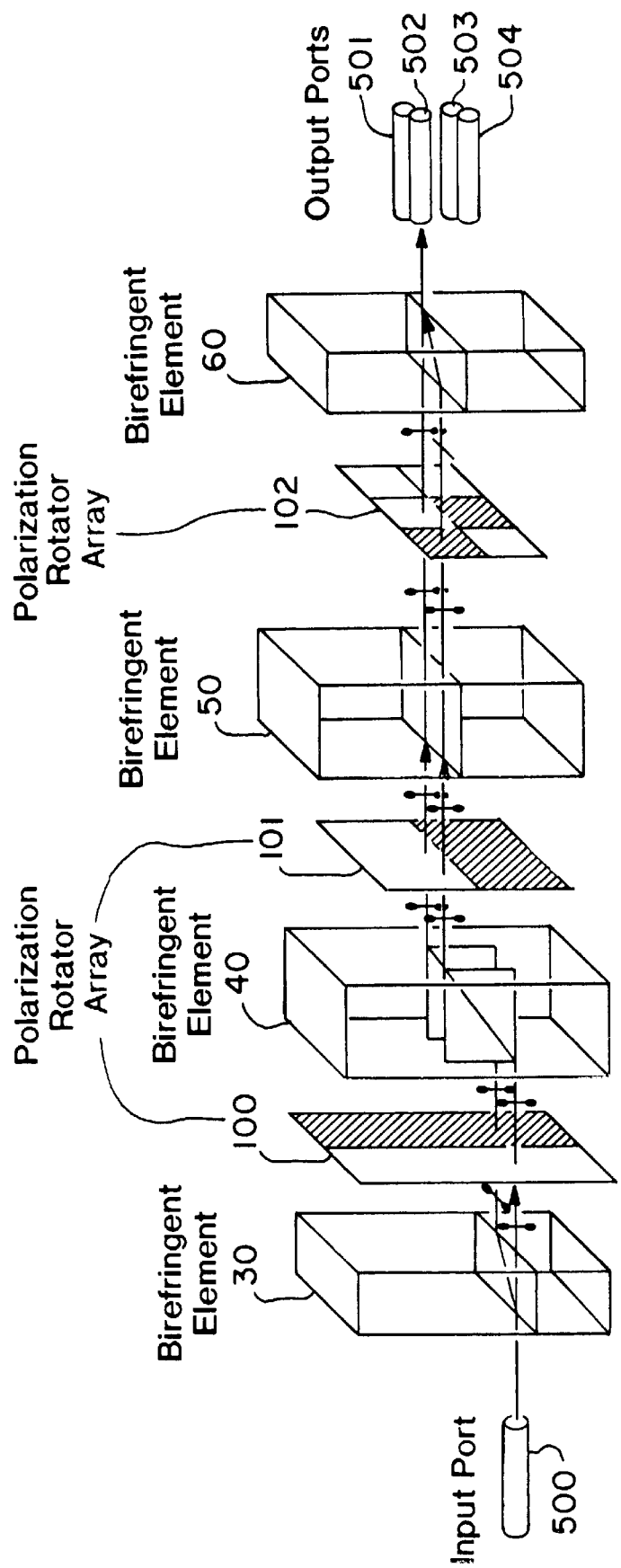

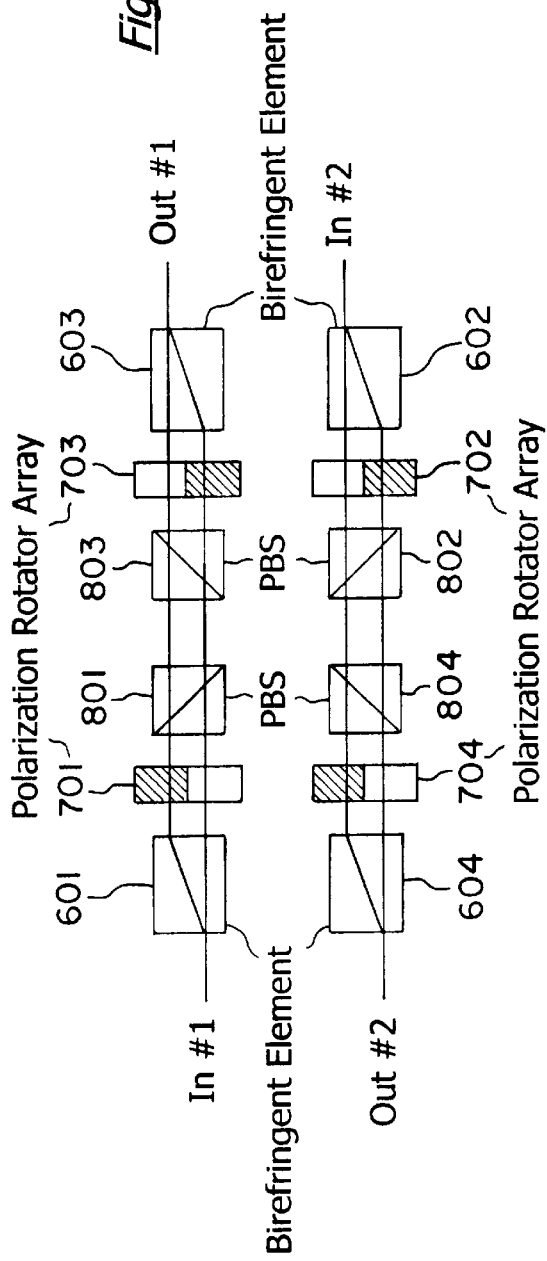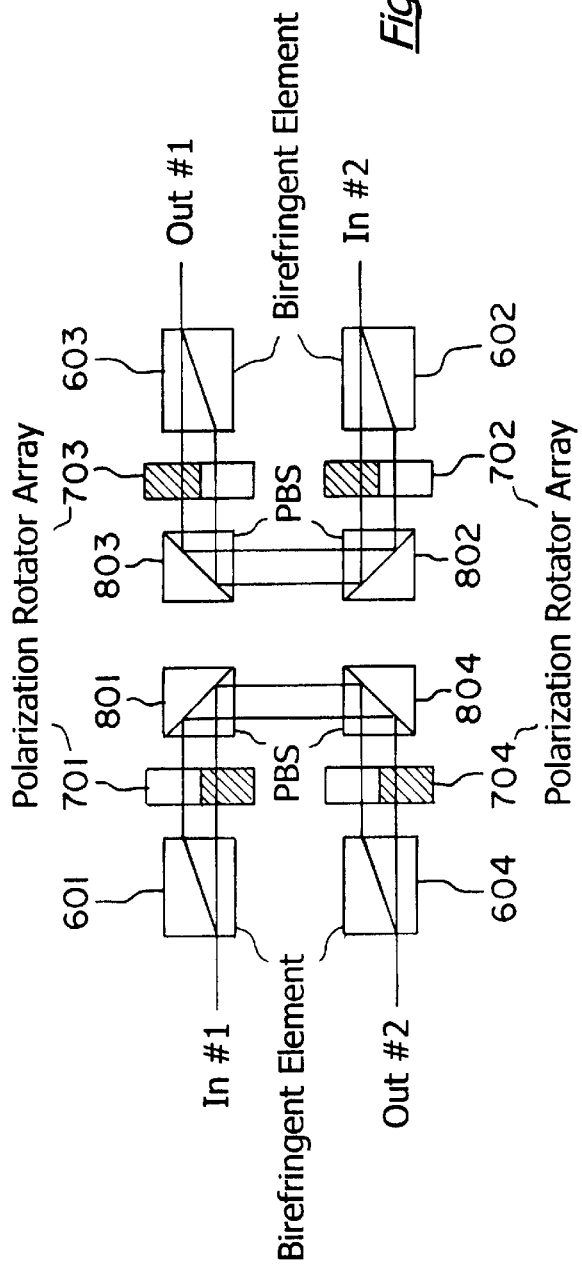
Fig. 20a
Fig. 20b

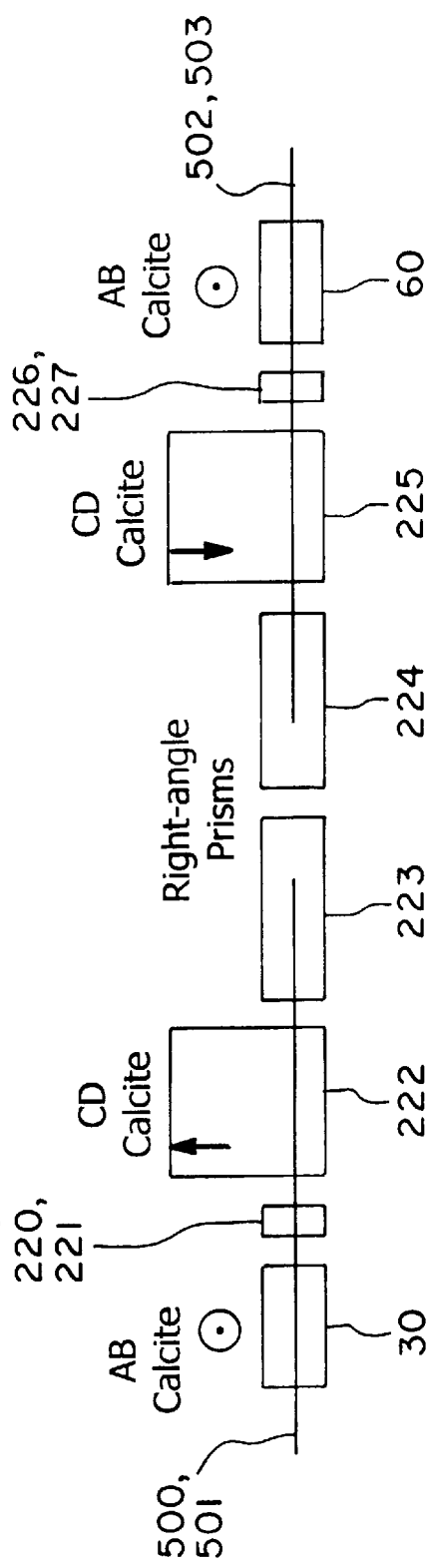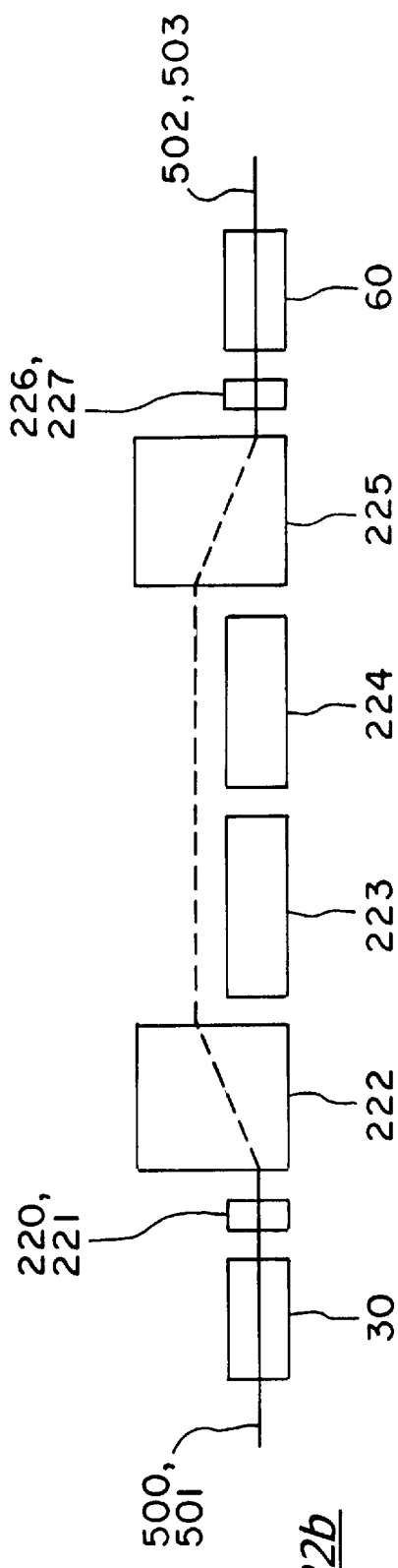

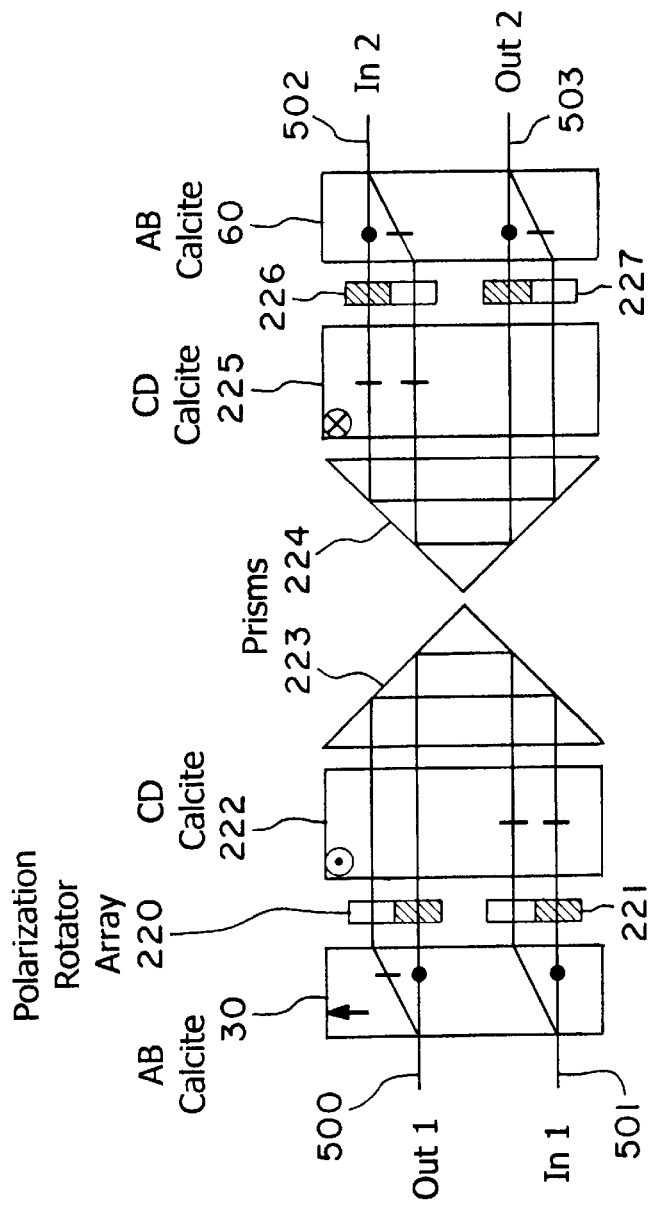
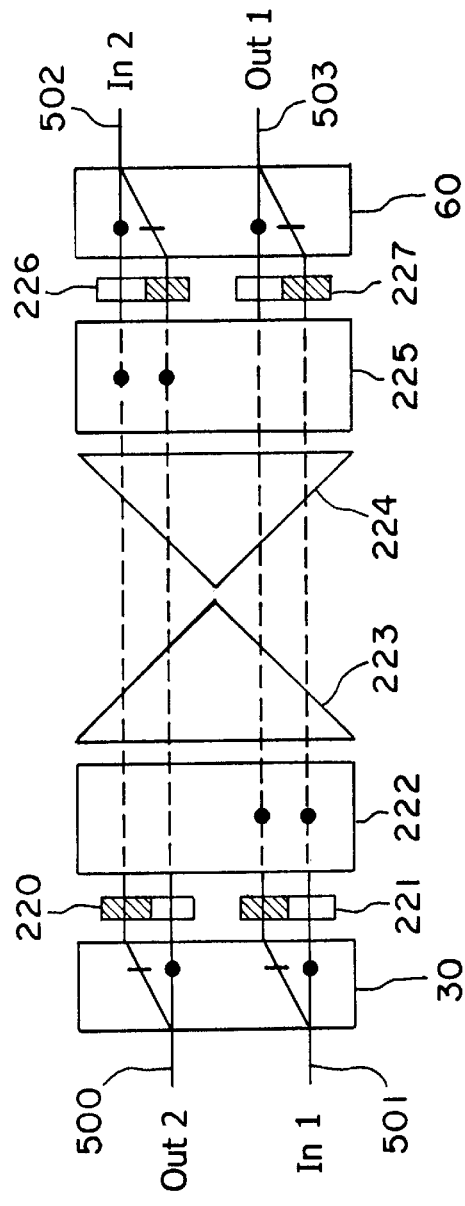
Fig. 22c
Fig. 22d

N+M DIGITALLY PROGRAMMABLE OPTICAL ROUTING SWITCH

RELATED APPLICATION

The present application is a continuation-in-part of the Applicants' co-pending U.S. patent application Ser. No. 08/979,525, entitled "1×N Digitally Programmable Optical Routing Switch," filed on Nov. 26, 1997, which is based on U.S. Provisional Patent Application 60/042,575, entitled "1×$2^N$ Digitally Programmable Optical Routing Switch," filed on Apr. 2, 1997.

BACKGROUND OF THE INVENTION

1. Field of the Invention

This invention relates generally to switching of optical signals; and in particular, to the spatial routing of optical signals transmitted in optical communication networks and optical signal processing.

2. Background of the Invention

Optical fibers are used as the physical media for transmitting optical signals in a variety of commercial and military applications. As the data rates of information continue to grow, it becomes increasingly difficult for conventional electronic switching systems to handle higher bandwidths. In addition, the required conversion between optical and electrical signals restricts the data format and increases costs. All-optical routing/switching technologies, characterized by high "data transparency," can switch or transfer optical signals from one transmission channel to another while the signals remain in optical form.

Several multiplexing schemes have been developed in fiber optic interconnection networks, including time-division multiplexing (TDM), wavelength-division multiplexing (WDM) and space-division multiplexing (SDM). Space-division switching is considered to be one of the most important fiber optic routing schemes. Major applications of space-division photonic switches are in fiber optic communication networks, optical gyroscopes, optical signal processing, and micro/millimeter wave signal distribution for phased-array radar systems.

A wide variety of electromagnetic field-controlled optical switches are commercially available. They are based on mechanical, electro-optic, thermo-optic, acousto-optic, magneto-optic, and semiconductor technologies. Each switching technology has its own advantages, but also has drawbacks as well. For example, mechanical switches are the most widely used routing components and provide very low insertion loss and crosstalk characteristics, but their switching time is limited to the millisecond range. They also have a limited lifetime because motor-driven parts are used. $LiNbO_3$ integrated optic switches, on the other hand, offer nanosecond switching times. However, $LiNbO_3$ switches suffer from the disadvantages of relative large insertion loss (5 dB), high crosstalk (20 dB) and polarization dependency.

Accordingly, efforts continue to develop field-controlled optical switches with lower channel crosstalk, reduced polarization dependent loss, and at least moderate reconfiguration speed. It is recognized that these efforts, when successful, can provide an essential component to fiber communication systems.

3. Solution to the Problem

The present invention employs an optical network of polarization rotator arrays and polarization-dependent routing elements (e.g., birefringent elements or polarized beamsplitters) to achieve an optical routing structure that provides polarization-independent and low-crosstalk switching over a wide operating range of temperatures and wavelengths. This optical switch retains the switched signals in optical format and preserves their optical properties.

SUMMARY OF THE INVENTION

This invention describes an optical routing switch for selectively routing an optical signal from any of a plurality of input ports to any of a plurality of output ports. The optical signal at each input port is spatially decomposed into two orthogonally-polarized beams by a first polarization-dependent routing element (e.g., a birefringent element or polarized beamsplitter). Beyond this point, a network of optical switches are placed along the optical paths of the pair of light beams. Each optical switch includes: (1) a polarization rotator that switchably controls the polarization of the input light beams so that both of the emergent beams are either vertically or horizontally polarized, according to the control state of the device; and (2) a polarization-dependent routing element that spatially routes the light beam pair to provide physical displacement based on their state of polarization. The final stage for each output port in the network consists of an array of polarization rotators that changes the polarization of at least one of the light beams, so that the two beams become orthogonally polarized. Finally, a polarization-dependent routing element (e.g., a birefringent element) intercepts the two orthogonally-polarized beams and recombines them to exit at the selected output port.

BRIEF DESCRIPTION OF THE DRAWINGS

The present invention can be more readily understood in conjunction with the accompanying drawings, in which:

FIGS. 3a through 3d are block diagrams of a 1×4 routing switch designed in a 2-dimensional structure based on FIG. 2b. FIGS. 3a through 3d illustrate the light paths for the input optical energy coupled to each of the selected output ports in the four control states of the switch.

FIGS. 4a through 4d are block diagrams of a 1×4 routing switch designed in a 2-dimensional structure based on FIG. 2a. FIGS. 4a through 4d illustrate the light paths for the input optical energy coupled to each of the selected output ports in the four control states of the switch.

FIGS. 5a through 5d are diagrams of a 1×4 routing switch using a 3-dimensional structure based on FIG. 2a. FIGS. 5a through 5d illustrate the light paths for the input optical energy coupled to each of the selected output ports in the four control states of the switch.

FIGS. 6a through 6d are diagrams of a 1×4 routing switch using a 3-dimensional structure based on FIG. 2b. FIGS. 6a through 6d illustrate the light paths for the input optical energy coupled to each of the selected output ports in the four control states of the switch.

FIGS. 7a through 7d are diagrams of a 1×4 routing switch using a 3-dimensional structure in which all the birefringent elements have the same thickness.

FIGS. 20a and 20b are diagrams of the two control states of an alternative embodiment of a 2×2 routing switch.

FIGS. 22a through 22d are diagrams of another alternative embodiment of a 2×2 routing switch.

DETAILED DESCRIPTION OF THE INVENTION

Figure 1:
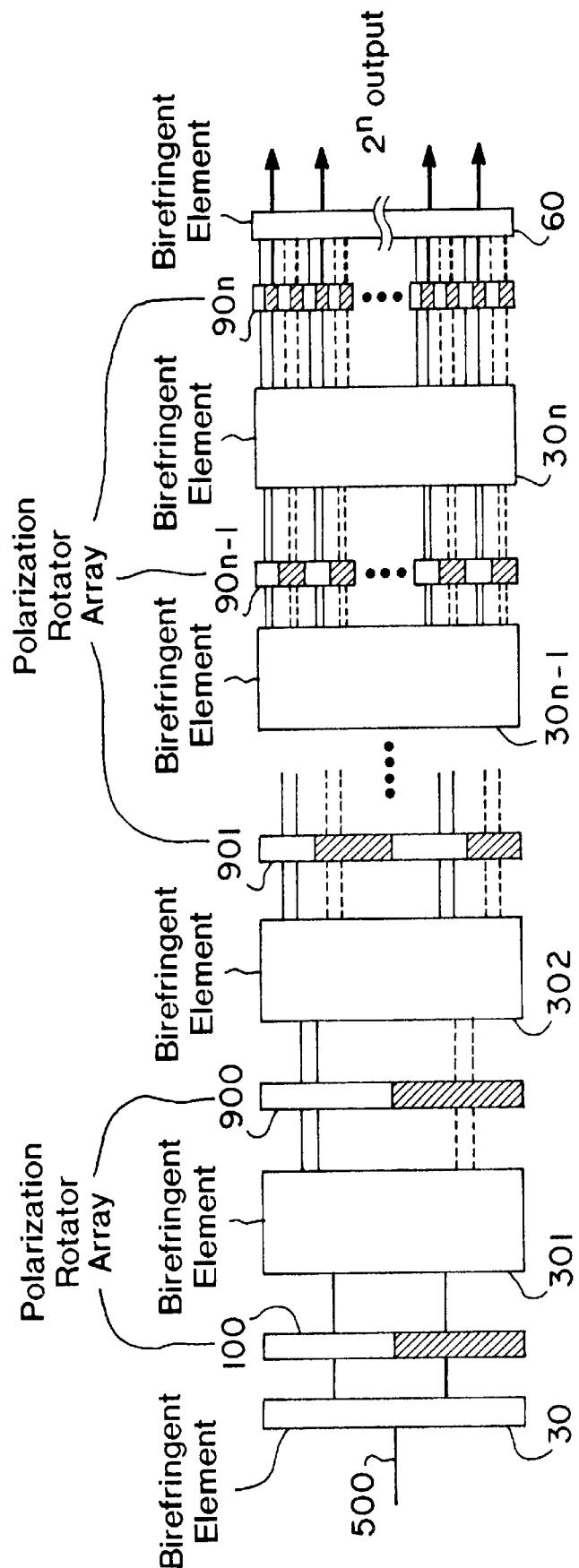
FIG. 1 is a block diagram of a 1×$2^N$ optical switch in accordance with present invention.

FIG. 1 illustrates the general concept of a $1 \times 2^N$ optical routing switch. An optical signal is input through an input port 500 and passes through a birefringent element (or polarization beam separator) 30. This birefringent element 30 decomposes the light beam into two components having orthogonal polarizations (e.g., horizontal and vertical). The two beams are also spatially separated by the first birefringent element 30 due to the birefringent walk-off effect. In FIG. 1, thin lines represent one state of polarization and thick lines represent the second, orthogonal polarization. The beams pass through a first array of polarization rotators 100, which consist of two sub-elements (or pixels) that intercept the two beams. The polarization rotator array 100 converts the polarization of one of the light beams, so that both beams have the same polarization when they exit the first polarization rotator array 100.

Both light beams then pass through a second birefringent element 301 that directs the light beams based on their polarization, due to the birefringent walk-off effect. At the output of the second birefringent element 301, there are two possible spatial positions for each of the light beams (drawn as the solid thin lines and the dashed thin lines after the second birefringent element 301) based on their polarization entering the second birefringent element 301. The two beams then pass through another array of polarization rotators 900 that are divided into two sub-elements as shown in FIG. 1. Based on the control states of the sub-elements in the polarization rotators 100 and 900, the pair of light beams exiting the second array of polarization rotators 900 can have either of two different polarizations (e.g., horizontal or vertical) and either of two possible spatial positions, thus resulting in four possible combinations of polarization and spatial position.

These four combinations are spatially separated using a third birefringent element 302. More specifically, the four possible combinations of polarization and position at the input plane of the third birefringent element 302 are separated into four possible spatial positions at its output plane due to the birefringent walk-off effect.

This combination of a birefringent element with an array of polarization rotators can be repeated in an arbitrary number of stages stacked in series along an optical axis. With N stages of the birefringent elements 301, 302, . . . 30n-1, 30n and polarization rotators 900, 901, . . . 90n-1, 90n inter-digitally placed together (i.e., 301/900, 302/901, 30n-1/90n-1, and 30n/90n as shown in FIG. 1), there are total of $2^N$ possible output positions for the original pair of beams entering the first stage.

The final polarization rotator array 90n converts the beam pair back to orthogonal polarizations. This is indicated by the thin and thick lines after the final polarization rotator array 90n, where thin lines represent one polarization and thick lines represent the orthogonal polarization. The orthogonally-polarized beam pair are combined by a final birefringent element 60 and exit at one of the $2^N$ output ports.

Figure 2A:
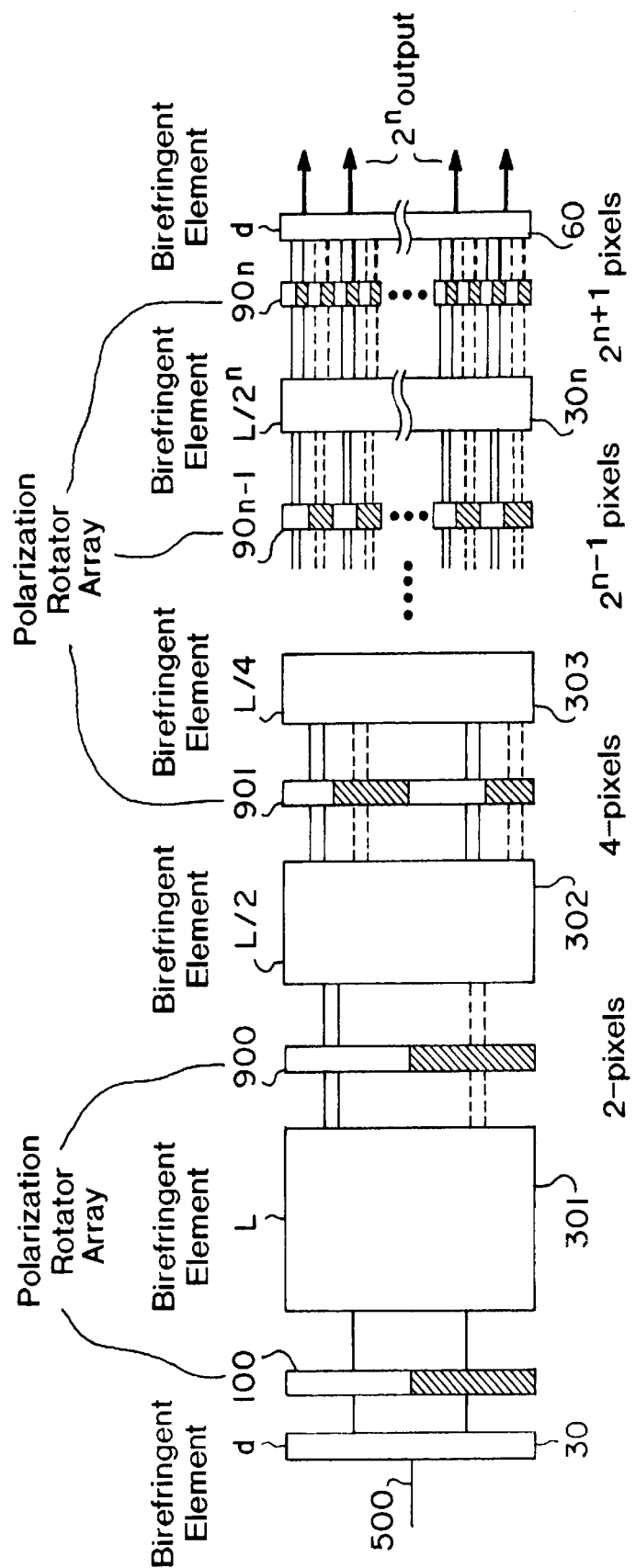
FIGS. 2a and 2b are block diagrams of two preferred architectures for optical routing switches in accordance with the present invention.
Figure 2B:
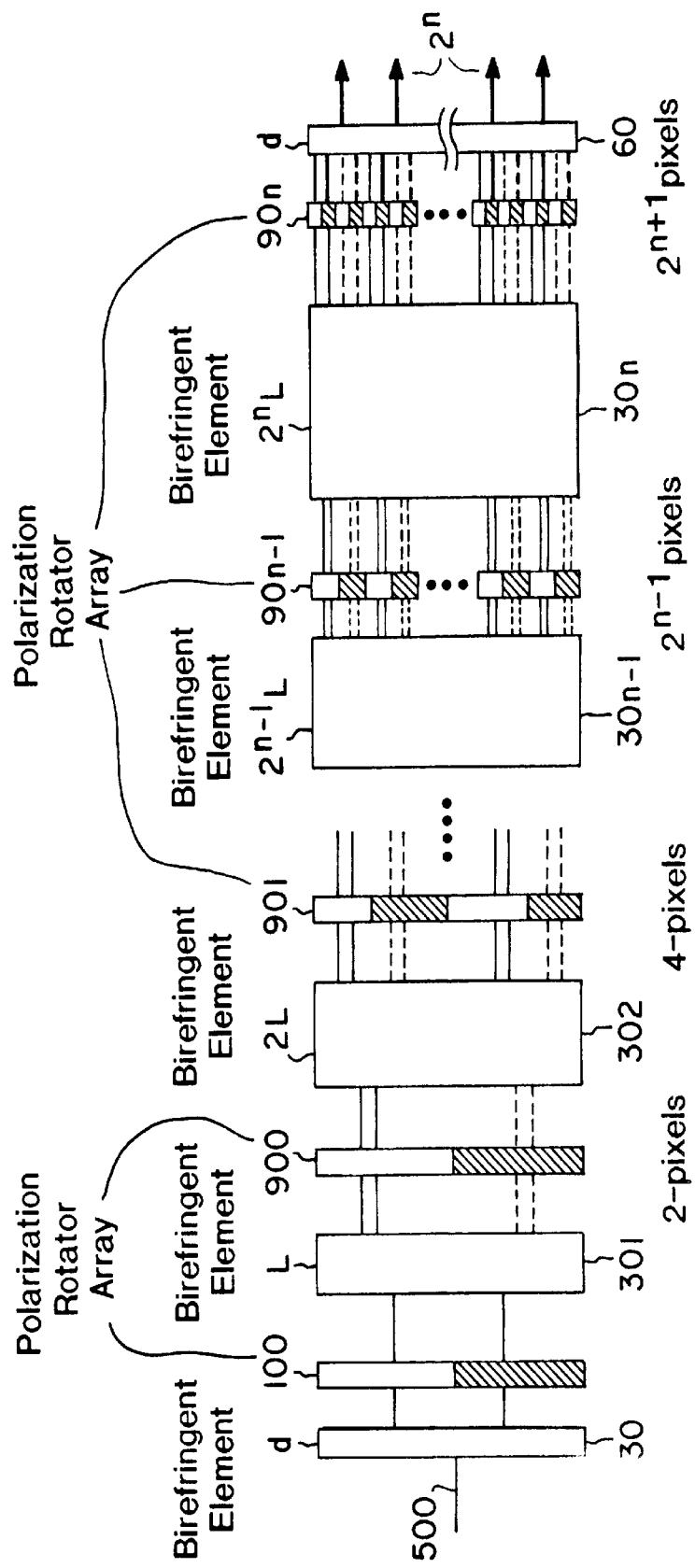

To help make the design fault tolerant, the thicknesses of the birefringent elements can be varied in a geometrical order, as shown in FIGS. 2a and 2b. In FIG. 2a, the birefringent elements have thicknesses of L, L/2, . . . , $L/2^{N-1}$, and $L/2^N$. In contrast, the order is reversed in FIG. 2b and the birefringent elements have thicknesses of L, 2L, . . . , $2^{N-1}$, and $2^N L$. The principle of operation is generally the same as described in FIG. 1. These variations in the thicknesses of the birefringent elements help maintain beam separation for the beam pair as they pass through each stage. A total of $2^N$ possible beam positions exist at the exit plane of final stage (i.e., at the birefringent element 30n). Therefore, the final polarization controller 90n must have $2^{N+1}$ pixels so that each of the $2^N$ possible beam pairs can be converted to orthogonal polarizations. The configurations shown in FIG. 2a and 2b help to provide sufficient beam separation so that the final polarization rotator array 90n can be pixelized for each of the possible output positions. This arrangement can then block the leakage of the light at each of the $2^{N+1}$ possible beam positions, which if passed, would cause cross-talk at undesired output ports.

Alternatively, the embodiments shown in FIGS. 1, 2a and 2b can also be viewed as a binary tree structure composed of a series of optical switching stages. Each stage includes: (a) a polarization rotator array 100, 900, 901, etc., selectively rotating the polarization of the input beam pair so that both beams have the same polarization determined by the control state of the switch; and (b) a birefringent element 301, 302, etc., selectively routing the beam pair to a selected one of the possible output beam positions determined by their polarization.

In particular, the orthogonally-polarized pair of beams exiting the first birefringent element 30 are received by the first stage 100, 301. Thereafter, the $N^{th}$ stage receives the beam pair in a selected one of $2^{N-1}$ possible input beam positions from the preceding stage and directs the beam pair to any of $2^N$ possible output beam positions determined by the control state of the pixels in the polarization rotator array for the state. A final polarization rotator array rotates the polarization of the beam pair exiting the last stage so that the beams are orthogonally polarized and can be combined by the final birefringent element 60 at a selected one of the output ports

2-D DESIGN OF A 1×4 OPTICAL ROUTING SWITCH.

A two-dimensional design of an optical routing switch is illustrated in FIGS. 3a through 3d. As before, light entering through from the input port 500 is split into two orthogonal polarizations by the first birefringent element 30. The optical axis of the birefringent element 30 is oriented obliquely to the light beam propagation direction such that the optical input is decomposed into a pair of orthogonally-polarized beams. The first polarization rotator array 100 is divided into two sub-elements with complementary states, i.e., when one is on and the other is off. This arrangement makes both light beams become either vertically or horizontally polarized at the exit plane of the first polarization rotator array 100. The circular dots and short parallel lines in FIGS. 3a through 3d represent vertical polarization and horizontal polarization, respectively.

Figure 3A:
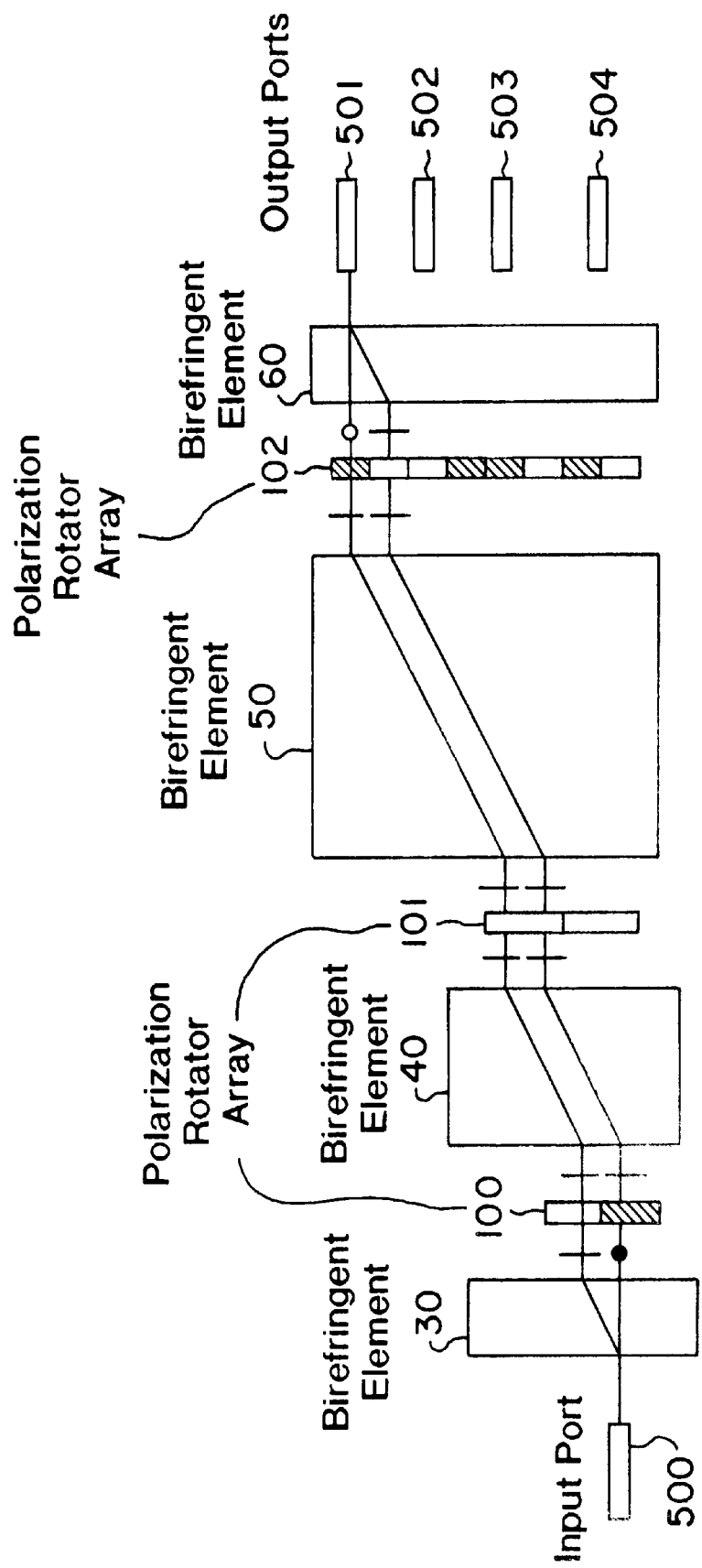

FIG. 3a depicts the optical routing switch configured to route the input signal to output port 501. In FIG. 3a, the first polarization rotator array 100 is set to rotate the vertically-polarization beam to horizontal polarization, so that both light beams have horizontal polarization when they exit the first polarization rotator array 100. These horizontally-polarized beams are redirected upward in the second birefringent element 40 because they are extra-ordinary waves in this birefringent element 40. The two beams then enter a second array of polarization rotators 101 having two sub-elements. In FIG. 3a, the second polarization rotator array 101 is set to provide no polarization rotation and the light beams keep their horizontal polarization. The beams then enter a third birefringent element 50, that has a thickness twice that of the second birefringent element 40. Here again, the beams propagate upward and exit at the highest level of the third birefringent element, because they are the extraordinary wave in this birefringent element 50. These two beams continue to have the same polarization as they reach the third array of polarization rotators 102. This array 102 has four pairs of pixels or sub-elements. As shown in FIG. 3a, one of the sub-elements is set to convert one of the beams to vertical polarization so that the beam pair becomes orthogonally polarized again. These two orthogonal beams are recombined by a fourth birefringent element 60 and exit at output port 501.

FIG. 3b shows the switch configured to couple input port 500 to output port 503. Here, the upper sub-element of the second polarization rotator array 101 rotates the polarizations of both beams by 90° so that their polarizations become vertical. These two vertically-polarized beams are considered as ordinary waves in the third birefringent element 50. Therefore, no deviation occurs and the beams travel straight through the third birefringent element 50. The two vertically-polarized beams are intercepted by the third polarization rotator array 102, which converts one beam to horizontal polarization. The resulting orthogonally-polarized beams are recombined by the fourth birefringent element 60 and exit at output port 503.

FIG. 3c shows the switch configured to couple the input port 500 to output port 502. Here, the control states of the sub-elements in the first polarization rotator array 100 are reversed in contrast to FIG. 3a, so that both beams are vertically polarized. The vertically-polarized beams are considered to be ordinary waves in the second birefringent 40, and therefore propagate straight through this birefringent element 40. The second polarization rotator array 101 is set to rotate the polarizations of both beams by 90°, so that they become horizontally polarized. These two horizontally-polarized beams are considered as extraordinary waves in the third birefringent element 50, and therefore travel upward within the birefringent element 50. Both beams are intercepted by the third polarization rotator array 102, which converts one of the beams to vertical polarization. The resulting orthogonally-polarized beams are recombined by the fourth birefringent element 60 and exit to output port 502.

FIG. 3d shows the switch configured to couple the input port 500 to output port 504. Here, the second polarization rotator array 101 is set to provide no polarization rotation, so that the two light beams maintain their vertical polarizations. These two vertically-polarized beams are considered as ordinary waves in the third birefringent element 50, and therefore travel straight through this birefringent element 50. The two vertically-polarized beams are intercepted by the third polarization rotator array 102, which changes the polarization of one of the beams to horizontal. The resulting orthogonal beams are recombined by the fourth birefringent element 60 and exit to output port 504.

Figure 4A:
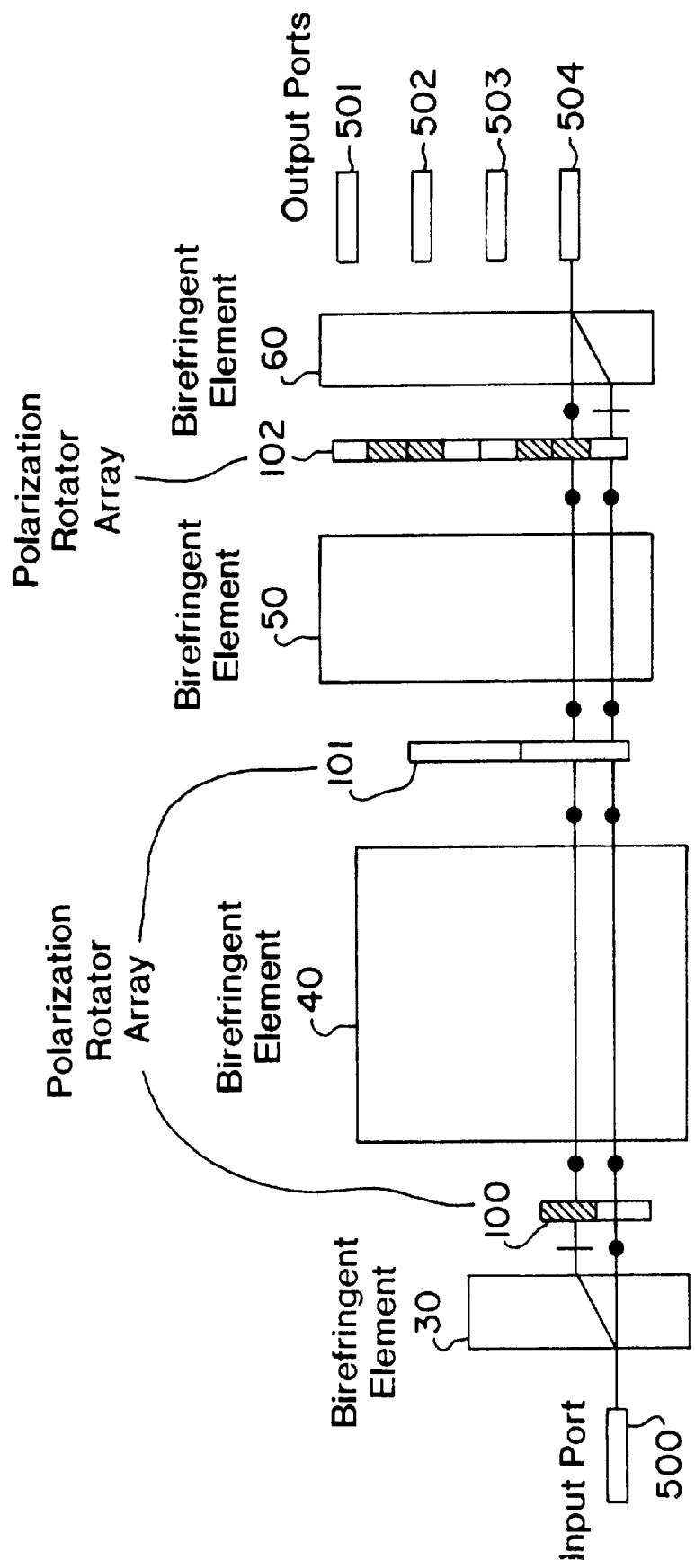
Figure 4B:
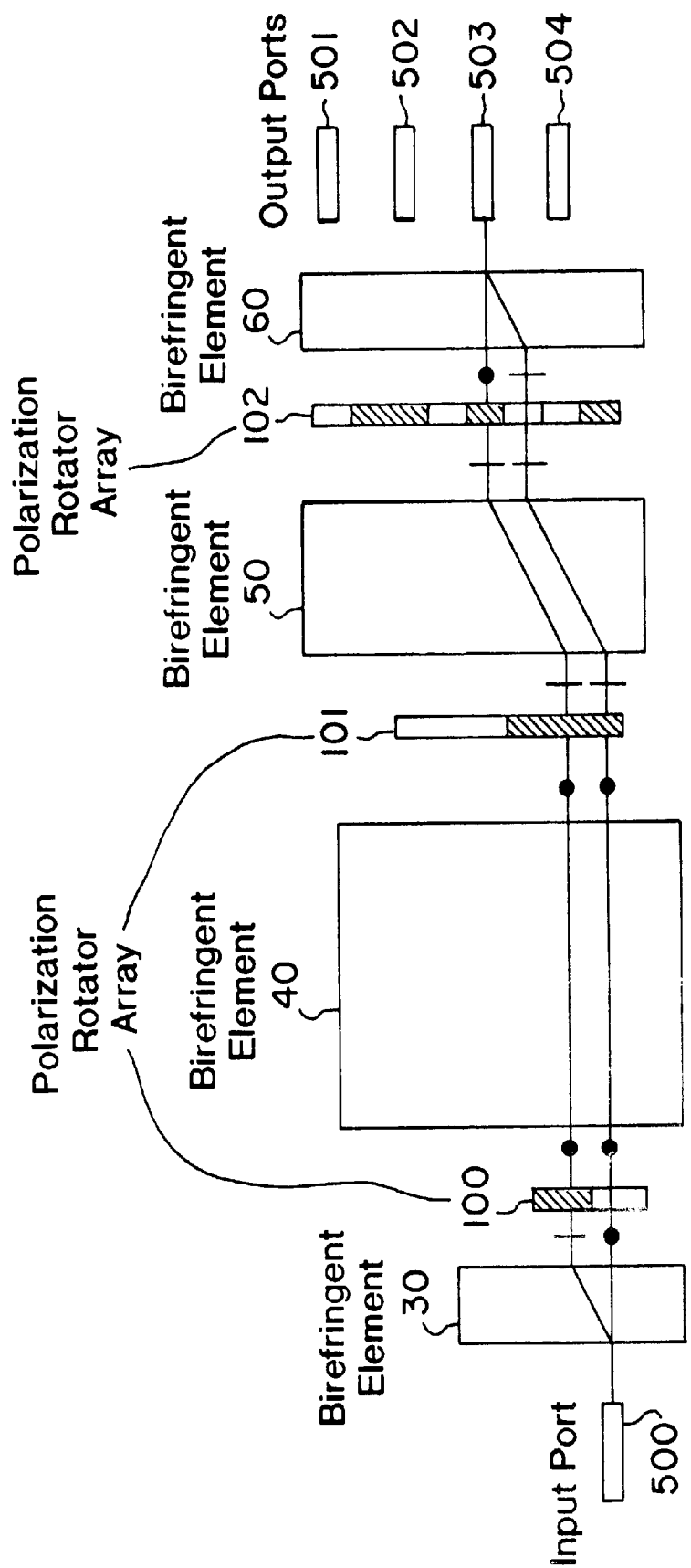
Figure 4D:
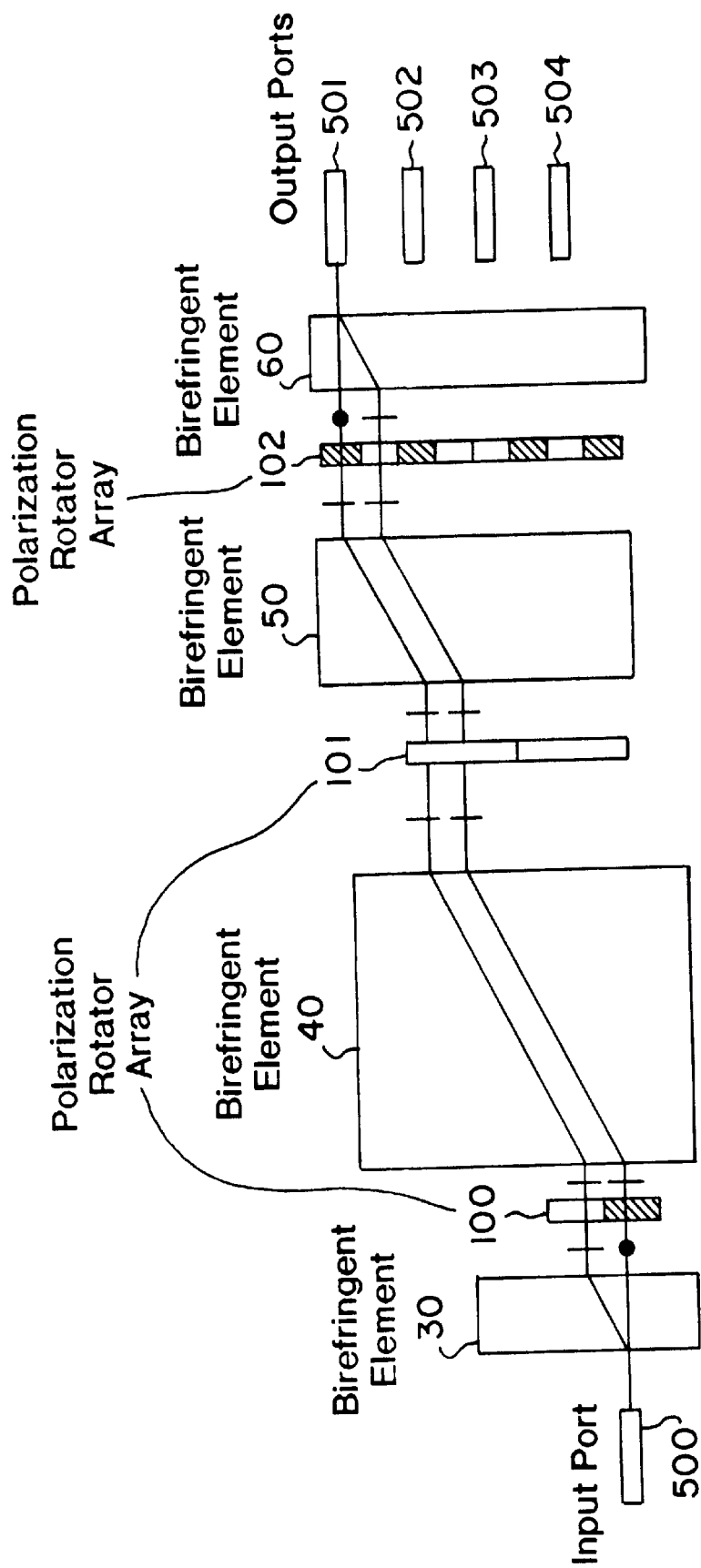

FIGS. 4a through 4d show another 2-D embodiment for a 1×4 optical switch. Here, the second and third birefringent elements are reversed so that the thicker element is closer to the input port 500. When the first polarization rotator array 100 is configured as depicted in FIGS. 4a and 4b, it controls the optical paths of the light beam pair so that they are directed to either output port 504 (FIG. 4a) or output port 503 (FIG. 4b) depending on the control state of the second polarization rotator array 101. When the first polarization rotator array 100 is switched to its complementary control state, shown in FIGS. 4c and 4d, the light beam pair is directed to either output port 502 (FIG. 4c) or output port 501 (FIG. 4d) depending on the control state of the second polarization rotator array 101. The final polarization rotator array 102, changes the polarization of one of the beams by 90° so that the beams return to orthogonal polarizations and are then recombined by the final birefringent element 60, as previously discussed.

With both of the designs disclosed above, two design consideration should be kept in mind. First, the On and Off characteristics of each sub-element in the polarization rotator arrays are controlled digitally (e.g., "1" for On and "0" for Off). Second, there are a total of $2^N$ output ports when N stages of birefringent elements and polarization rotator arrays are placed in series. Each of the stages produces two possible output directions. Based on these design concepts, a digitally programmable optical routing switch can be realized. A control state table is provided in Table 1.

Another key feature of the present design is its fault tolerance. This can be better understood by considering FIGS. 3a–3d and 4a–4d. In both sets of figures, the polarization rotator arrays are shown with filled and unfilled squares to represent polarization rotation and no polarization rotation, respectively, for each sub-element. For example, the last polarization controller 102 in both figures has four pairs of sub-elements. The sub-elements in each pair to controlled in complementary states (i.e., when one sub-element is on and the other sub-element in the pair is off). As shown in the figures, the four pairs of sub-elements are arranged such that only the pair intercepting the light beams has its upper sub-element set for vertical polarization and its lower sub-element set for horizontal polarization. The other three pairs are set to complementary states so that the polarization of any leaked optical energies are turned to the opposite polarization and are thereby sent in the wrong direction by the birefringent elements. For example in FIG. 3a, the eight pixels of the third polarization rotator array 102 are set to On, Off, Off, On, On, Off, On, Off from top to down. If we compare the pixels in FIG. 3b, 3c and 3d, except the first two pixels, this combination is the reverse of these control states in which light beams can be coupled to those three ports. This blocking assures low cross-talk between the output channels.

Here again, this embodiment can also be viewed as a tree structure of 1×2 optical switches receiving the beam pair exiting the first birefringent element 30. Both stages in the tree structure include a polarization rotator array 100, 101 that selectively rotates the polarization of the beam pair so that both beams have the same polarization determined by the control state, and a birefringent element 40, 50 that selectively routes the beam pair along either of two alternative optical paths determined by their polarization. The final polarization rotator array 102 rotates the polarization of the beam pair so that they are orthogonally polarized, and the final birefringent element 60 combines the orthogonally-polarized beams at the desired output port 501–504.

3-D DESIGN OF A 1×4 OPTICAL ROUTING SWITCH

FIGS. 5a through 5d show a three-dimensional structure for a 1×4 optical switch. Here, the second and third birefringent elements 40 and 50 have been oriented at 90° with respect to the first and fourth birefringent elements. The optical signal from the input port 500 enters the first birefringent element 30 and is split into horizontally and vertically polarized components. In the following figures, double-headed lines parallel to the base plane of the setup represent horizontal polarization, whereas double-headed lines perpendicular to the base plane represent vertical polarization.

Figure 5A:
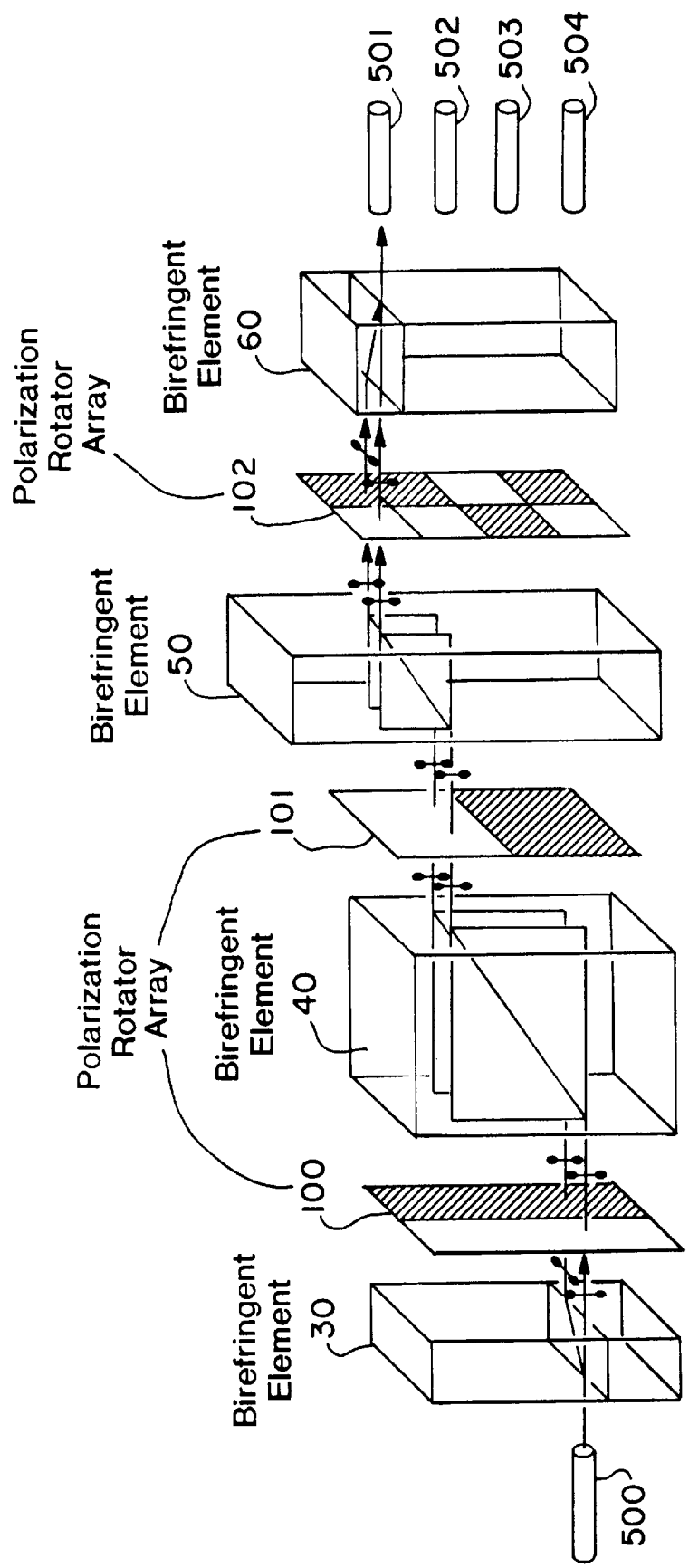

FIG. 5a depicts an optical routing switch configured to route the input signal to output port 501. In FIG. 5a, the polarization rotator 100 has the state of (On, Off) that changes the horizontally-polarized beam to vertical polarization. The two light beams then carry the same vertical polarization at the exit of the first polarization rotator array 100. These two vertical polarizations are considered to be extraordinary waves when passing through the second birefringent element 40 and therefore propagate upward. The second polarization rotator array 101 intercepts the beam pair but applies no polarization rotation so that the both beams maintain vertical polarization. The beams then enter the third birefringent element 50 and again propagate upward. The two vertical polarizations pass through a third polarization rotator array 102, which rotates the polarization of one of beams by 90° so that they become orthogonal again. The orthogonally-polarized beam pair is recombined by the fourth birefringent element 60 and exit at output port 501.

In FIG. 5b, input port 500 is coupled to output port 502. Again, the same vertical polarizations result after the first polarization rotator array 100, as in the case of FIG. 5a. The beams propagate upward and exit at the higher level of the second birefringent element 40. In the case of FIG. 5b, the second polarization rotator array 101 is set to "On" and the polarizations of both beams are rotated by 90 degrees (i.e., both beams become horizontally polarized). The horizontally- polarized beams are considered to be ordinary waves in the third birefringent element 50 and therefore propagate straight through this element 50. The final polarization rotator array 102 intercepts the two beams and rotates the polarization of one of the beams by 90 degrees so that the beam pair will be recombined by the fourth birefringent element 60 and exit at output port 502.

Figure 5C:
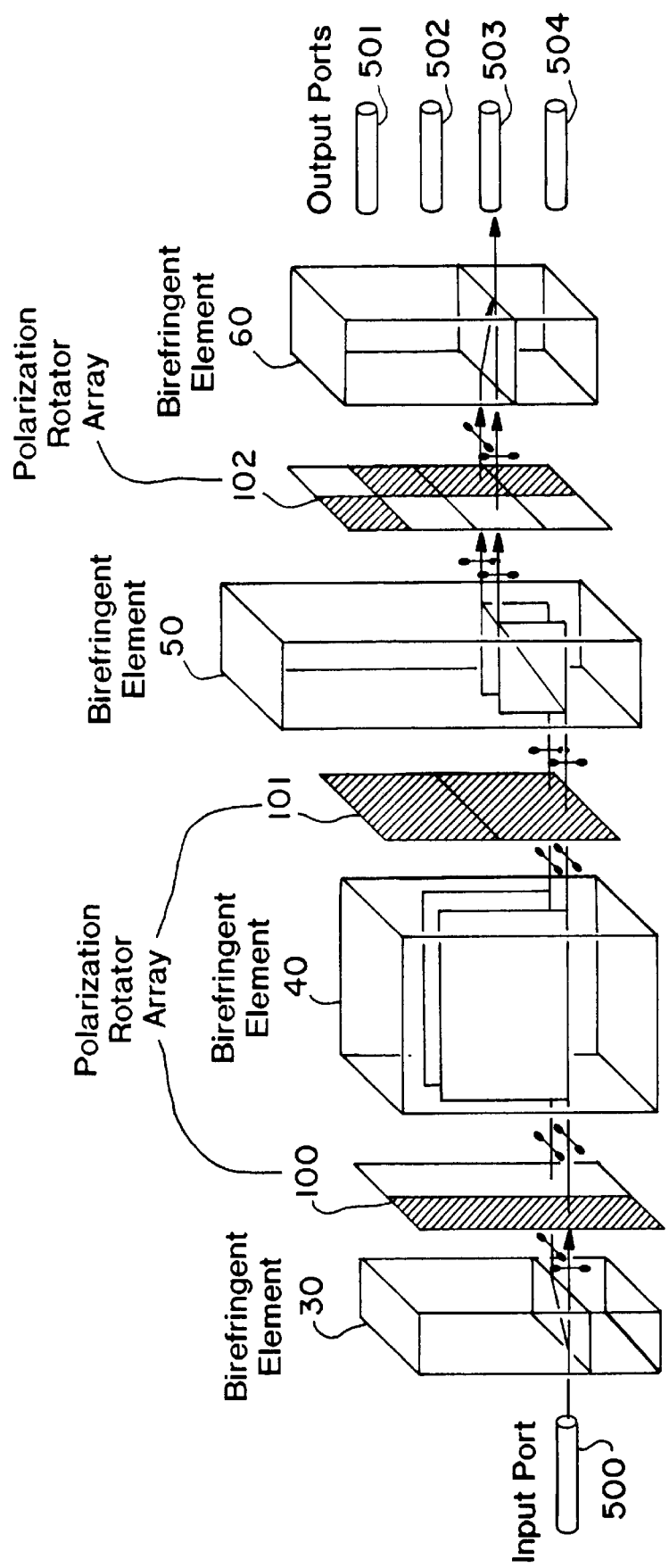

In FIG. 5c, input port 500 is coupled to output port 503. The sub-elements of the first polarization rotator array 100 are switched to the complementary states from those of the previous two cases. This results in horizontal polarizations when the beam pair passes through the first polarization rotator array 100. Both beams propagate straight through the second birefringent element 40 (at its lower level) because they are considered as ordinary waves in the birefringent element 40. The polarizations of both beams are rotated by 90° by the second polarization rotator array 101, so that they become vertically polarized. These vertically-polarized beams are considered to be extra-ordinary waves in the third birefringent element 50 and propagate upward. The final polarization rotator array 102 intercepts the two beams and rotates the polarization of one of the beams by 90° such that they become orthogonally polarized. The beams are recombined by the fourth birefringent element 60 and exit at output port 503.

Figure 5D:
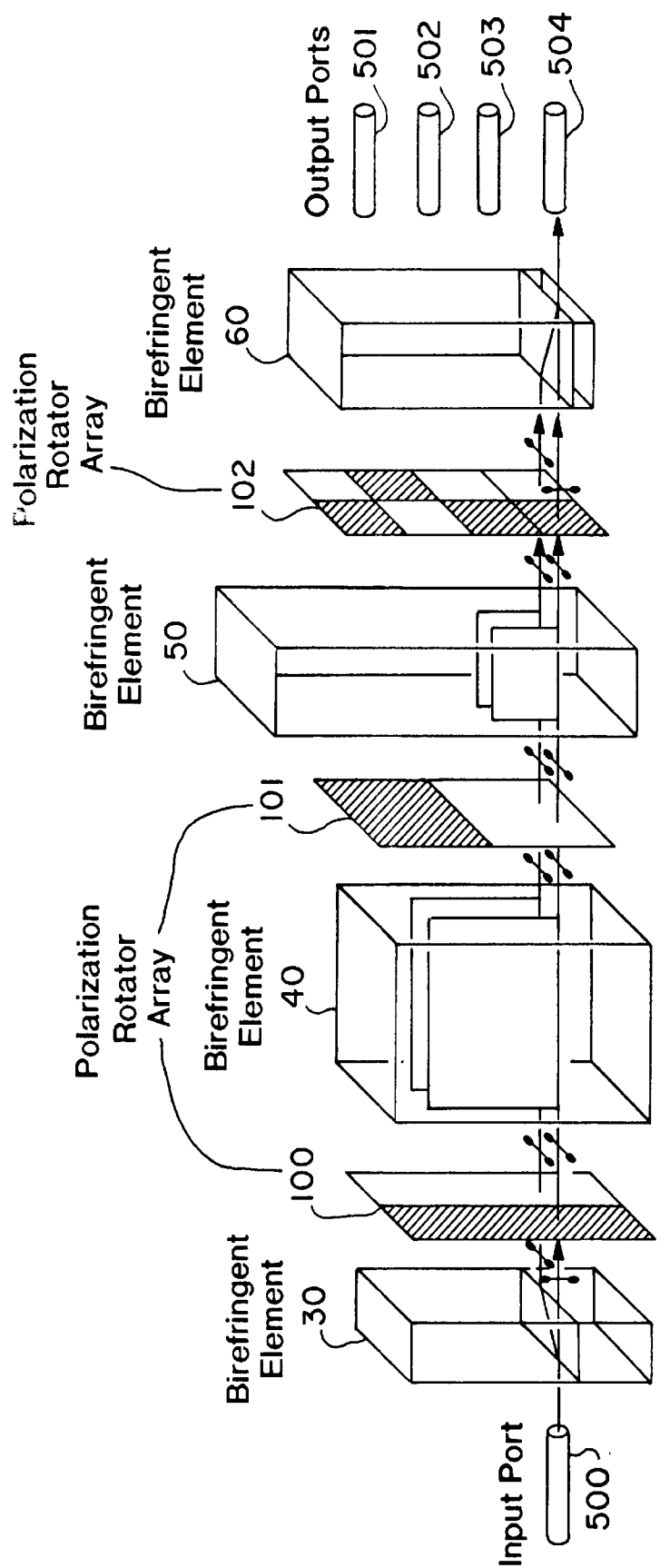
Figure 6B:
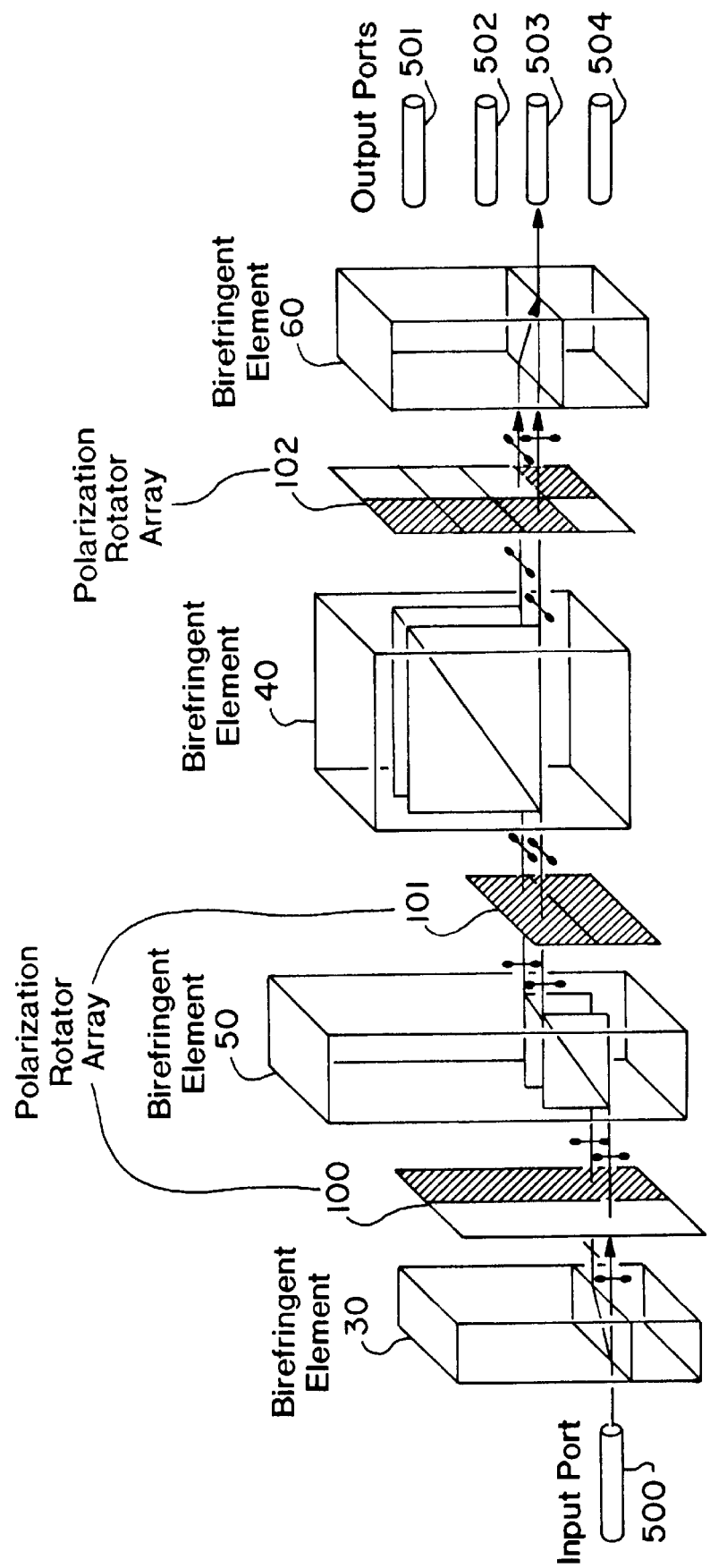
Figure 6C:
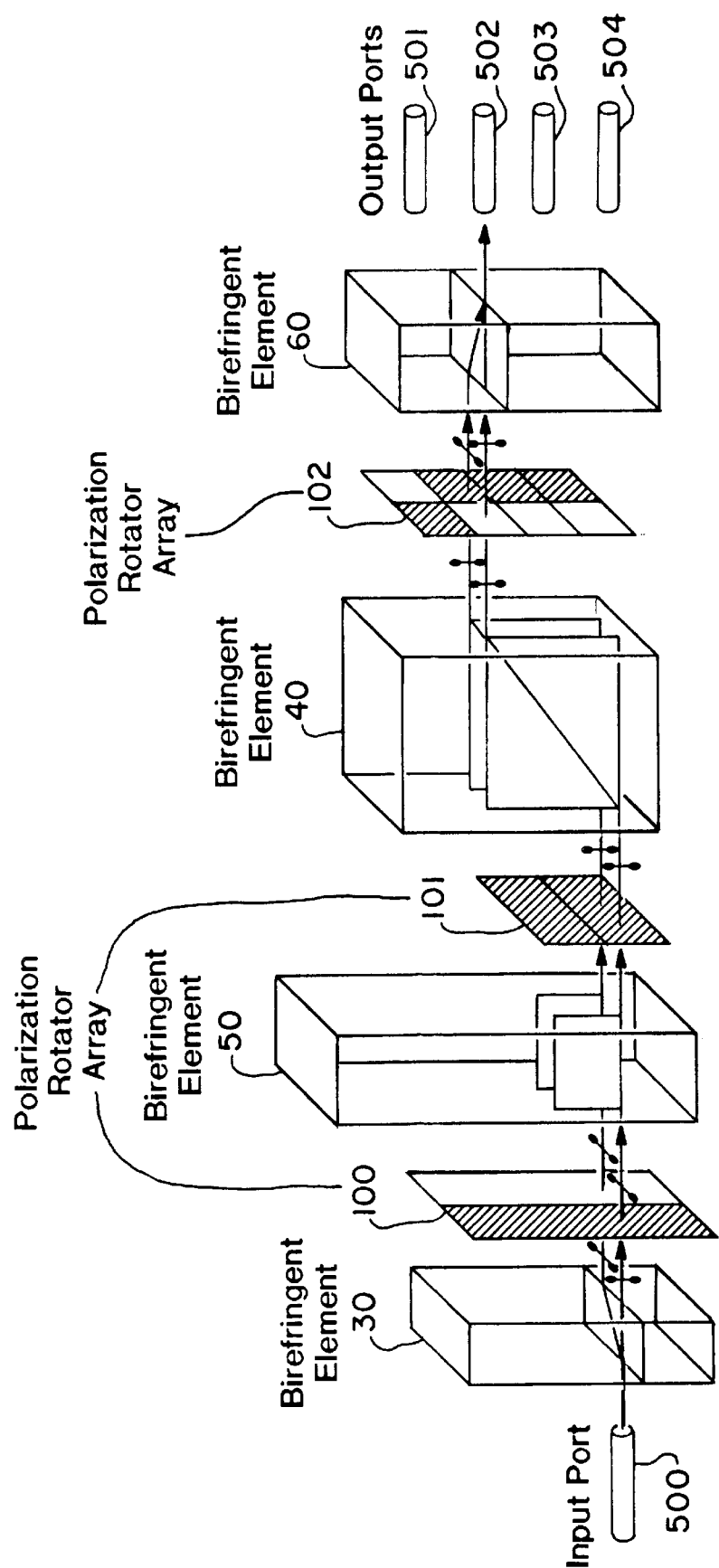
Figure 6D:
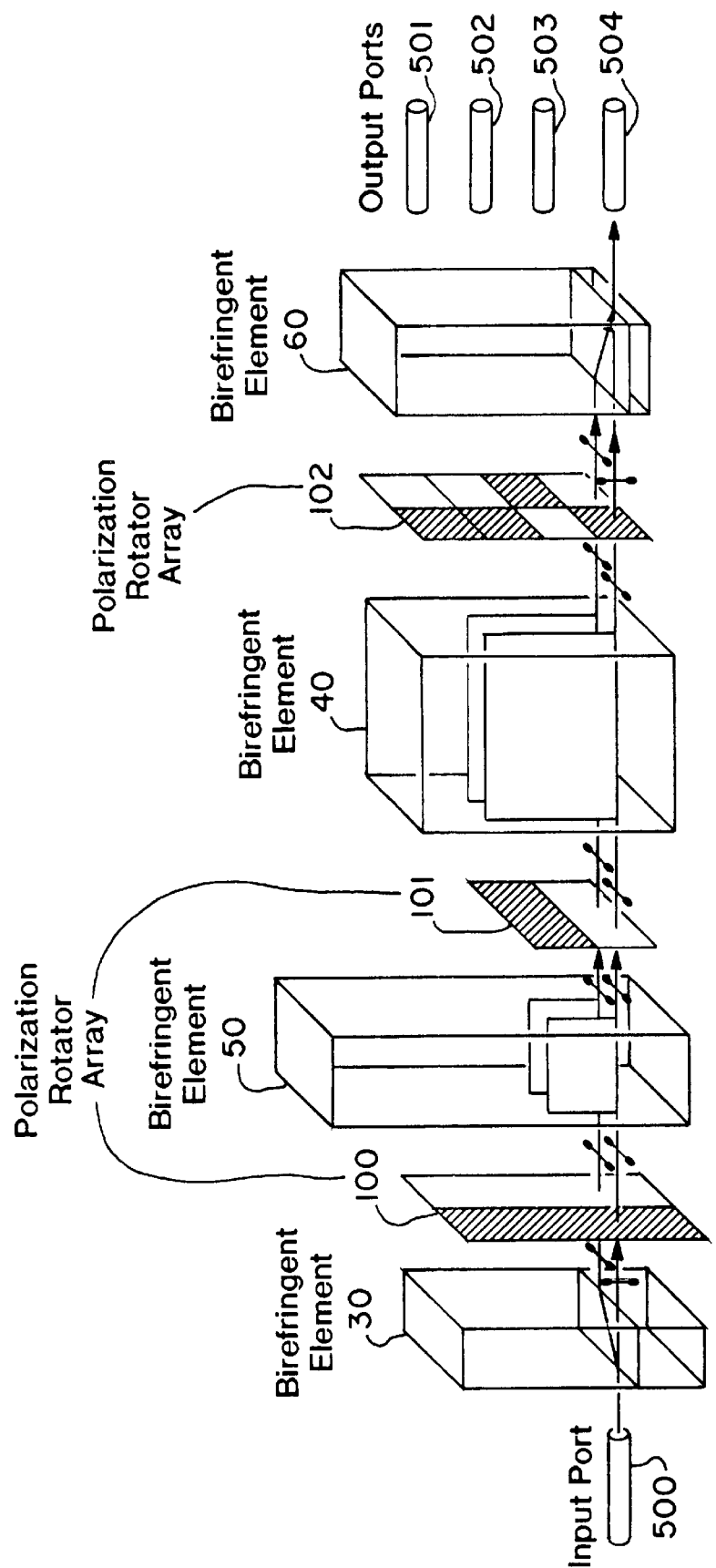
Figure 7C:
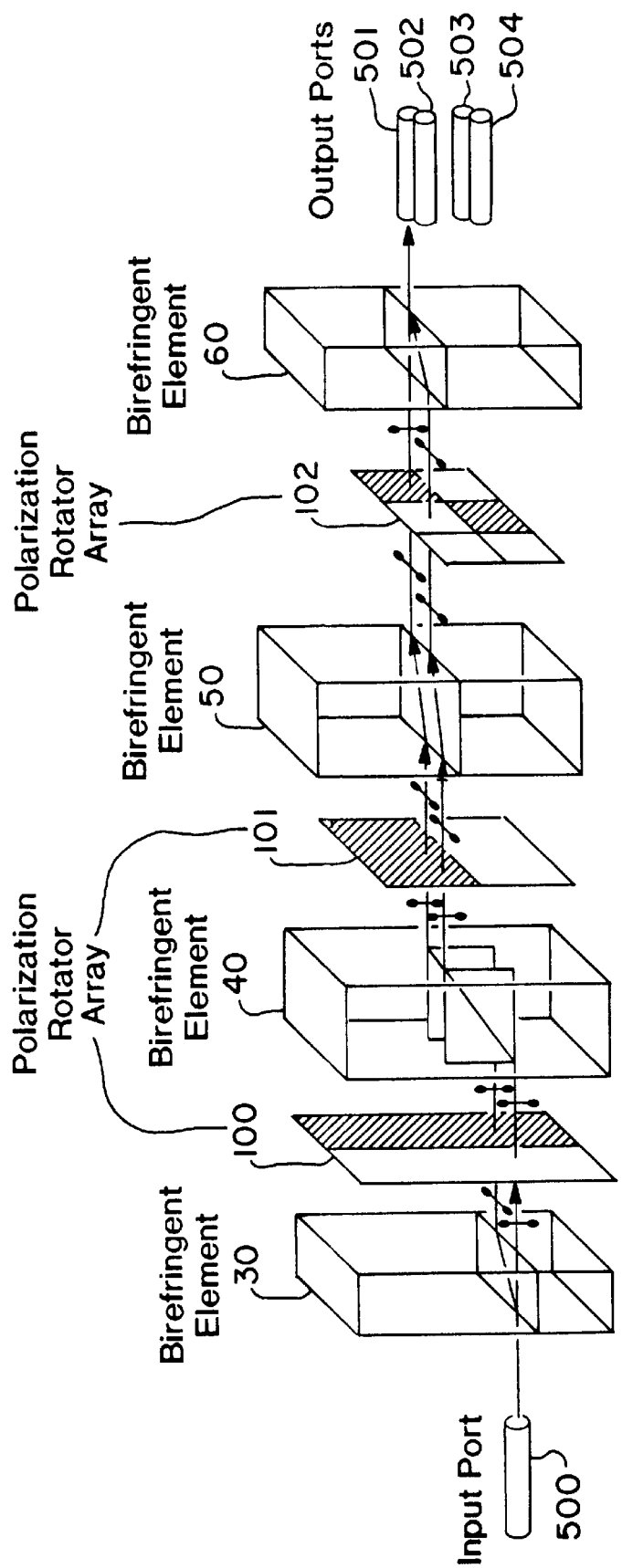

In FIG. 5d, input port 500 is coupled to output port 504. In this case, the first polarization rotator array 100 is set to the same control state as in FIG. 5c. This results in horizontal polarizations when the beam pair passes through the first polarization rotator array 100. The beams propagate straight through the second birefringent element 40 (at its lower level) because they are considered as ordinary waves. In this final control state, the polarization controller 101 is set to apply no polarization rotation to the light beams. The horizontally-polarized beams are considered to be ordinary waves in the third birefringent element 50 and propagate straight through this element 50. The final polarization controller 102 intercepts the two beams and rotates the polarization of one of the beams by 90 degrees. The orthogonally-polarized beams are recombined through the fourth birefringent element 60 and exit at output port 504.

FIGS. 6a through 6d show another 3-D design of a 1×4 routing switch. In this case, the order of the second and third birefringent elements is reversed in comparison to those in FIGS. 5a through 5d. Here, the first polarization rotator array 100 combines with the second birefringent element 50 to determine whether the beams are directed to either a first set of output ports 501, 503 or a second set of output ports 502, 504. The combination of the second polarization rotator array 101 and the third birefringent element 40 determine whether the beams are directed to either output port 501 or 503 in the first set, or output port 502 or 504 in the second set.

FIGS. 7a through 7d are diagrams of yet another 3-dimensional embodiment of a 1×4 optical routing switch in accordance with the present invention. All the birefringent elements have the same thickness.

As can be understood from the above designs, these routing switches are workable when the polarization rotators intercepting the light beam pair are set to the correct control states. All other sub-elements can be left afloat or switched to arbitrary control states. However, to maintain high-performance and low crosstalk for the routing switch, the sub-elements or pixels are carefully arranged such that the total effect to block optical leakage to the output ports is maximized. For example, as shown in FIGS. 6a–6d, pixels of the third polarization rotator array 102 are set to be complementary to their original state. Therefore, any undesired optical leakage from incomplete polarization rotation will be rotated into wrong polarizations and will not be coupled to the output ports, thereby minimizing crosstalk.

1×N ROUTING SWITCH USING POLARIZED BEAMSPLITTERS.

In the previously discussed embodiments, optical signal routing is obtained through use of a tree architecture. In those cases, each of the optical switching stages redirects the optical signal into either of two possible optical paths. As the signal propagates through the switch, N stages result in $2^N$ possible output ports. In contrast, the following examples of 1×N switches (where N is an arbitrary number) shown in FIGS. 8 through 12 illustrate switches using a series architecture. In these switches, polarization beamsplitters (PBS) are used in place of birefringent elements as polarization-dependent routing elements.

A polarized beamsplitter (PBS) permits light of a predetermined polarization to pass directly through the beamsplitter, but orthogonally-polarized light is reflected or refracted within the beamsplitter and exits along a separate optical path. This is typically 90 degrees from the first beam, as shown in FIGS. 8 and 10.

Figure 8:
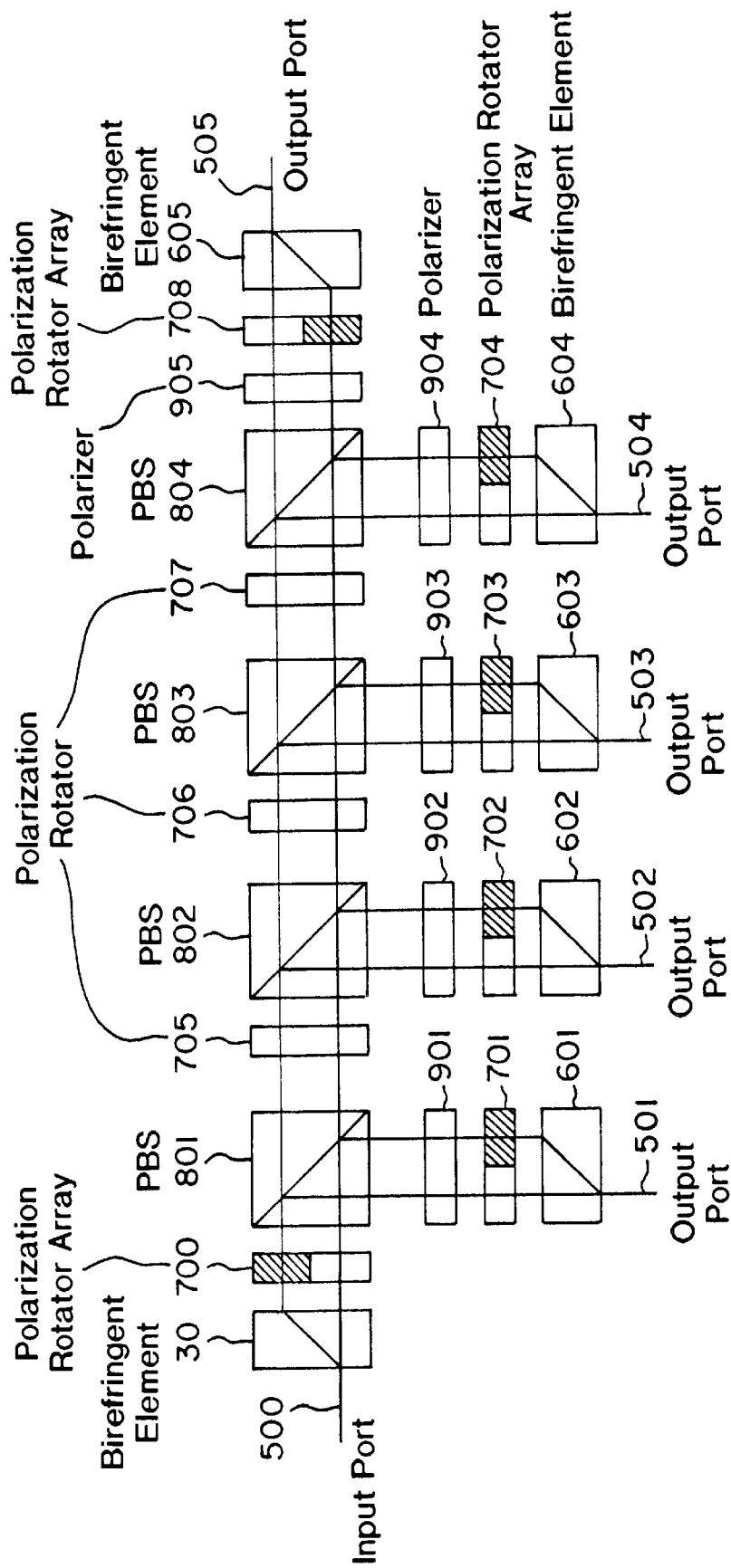
FIG. 8 is a diagram of an alternative embodiment of a 1×5 routing switch using polarized beamsplitters in place of birefringent elements.

FIG. 8 illustrates the structure for a 1×5 optical switch. The birefringent elements used in the previous cases have been replaced by polarized beamsplitters 801, 802, 803, and 804. Each PBS is coupled with a polarization rotator 700, 705, 706, and 707 that rotates the polarization of the beam pair accordance with the control state of the optical switch. Each pair of a polarization rotator and a PBS can be considered as a 1×2 optical switching stage. For example, the polarization rotator 705 controls the state of polarization of the beam pair to be either vertical or horizontal. The following PBS 802 either routes the beam pair to output port 502 or passes it through to the next stage for further routing. The polarization separation and recombination at the input and output ports are the same as before, using a birefringent element 30, 601, 602, 603, 604, and 605 in combination with a double-pixel polarization rotator array 700, 701, 702, 703, 704, and 708 for orthogonal polarization control.

Due to the typical low polarization extinction ratio of a PBS, a series of optional polarizers 901, 902, 903, 904, and 905 are used at each of the output ports 501 through 505 in the embodiment depicted in FIG. 8. These high extinction ratio polarizers (e.g., a Polarcor dichroic glass polarizer with a polarization extinction ratio of 10000:1) purify the polarization to reduce cross-talk. It is noted, however, the switch can perform its basic function without the use of these polarizers.

Figure 10:
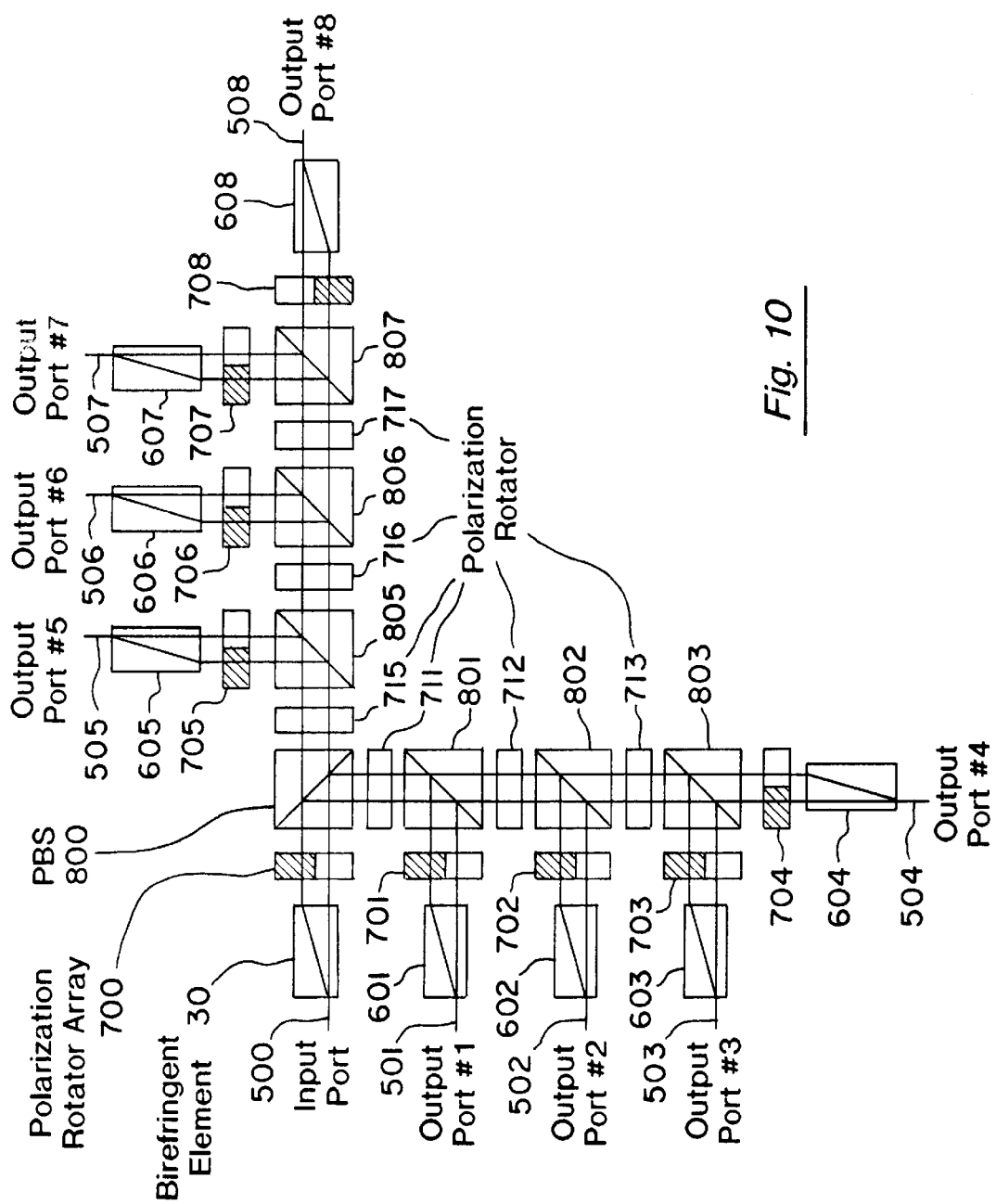
FIG. 10 is a diagram of another alternative embodiment of a 1×8 routing switch using polarized beamsplitters.

FIG. 10 provides an example of a 1×8 switch using two series of switching stages based on polarized beamsplitters. Each stage consists of a polarization rotator 700, 711–713, and 715–717 in combination with a PBS 800–807 to create a 1×2 optical routing switch. The first PBS 800 routes the beam pair to either output ports 501–504 or 505–508, based on the control state of the two pixels in the first polarization rotator array 700. The operation of the remainder of the two series of stages in this 1×8 switch is similar to that described above and shown in FIG. 8.

Figure 11:
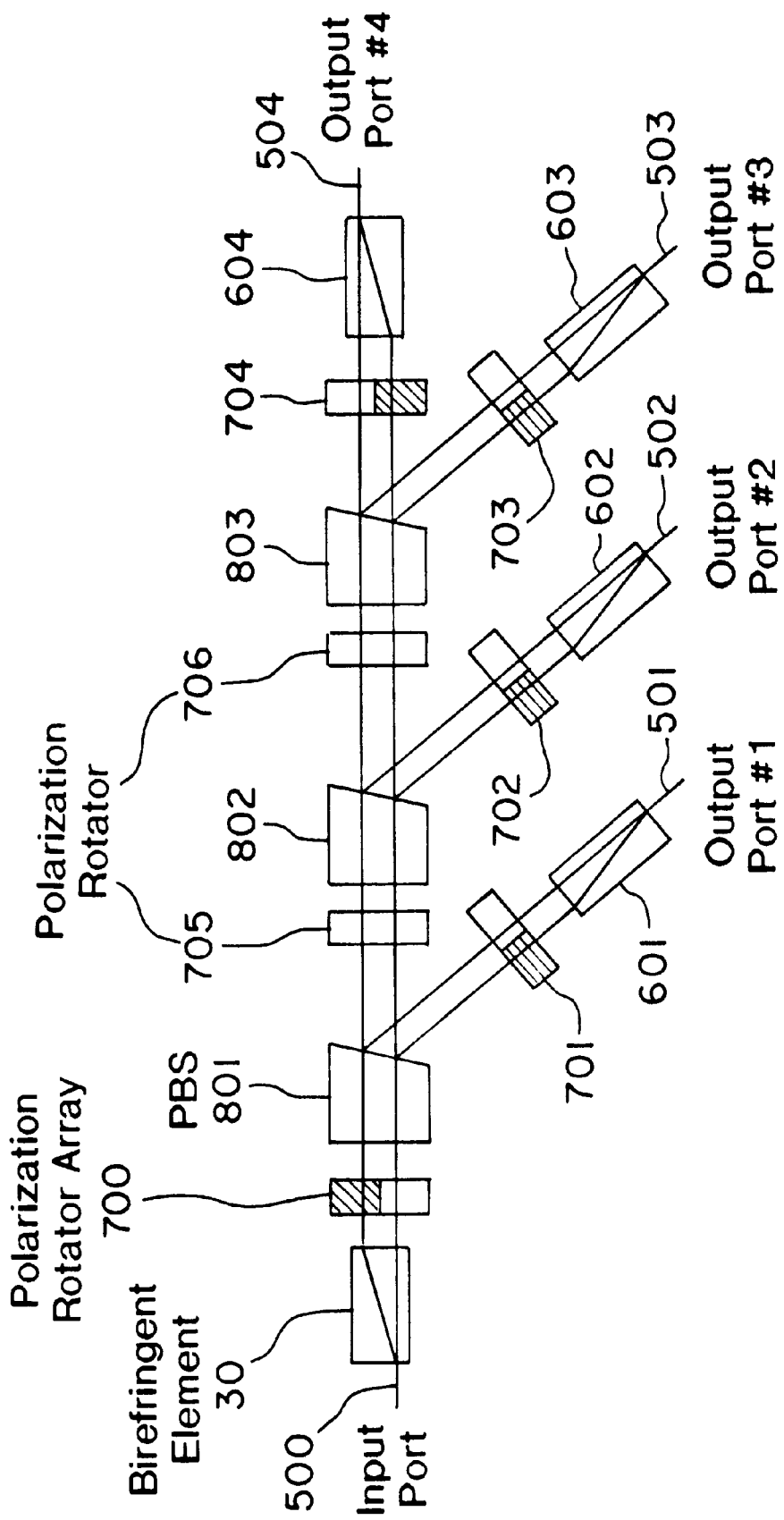
FIG. 11 is a diagram of another alternative embodiment of a 1×4 routing switch using angled polarized beamsplitters.

FIG. 11 illustrates a 1×4 optical routing switch using another type of polarization-dependent routing element 801, 802, and 803 that has an offset angle at the output for vertical and horizontal polarizations. This type of polarization separator 801–803 can be regarded as a compromise between the properties of a birefringent element (i.e., parallel beam output, high extinction ratio) and a PBS (perpendicular beam outputs, low extinction ratio). It provides a high polarization contrast ratio and also separated the output beams at an angle.

This feature relaxes some of the practical constraints in fabricating the device, such as packaging of the Grinlens at the output port. If a 1×8 switch is constructed using birefringent elements so that the two orthogonal polarizations are parallel to each other, three birefringent elements are needed having thicknesses of d, 2d, and 4d, respectively. With the current Grinlens size of 1.8 mm (which defines the minimum distance between the output ports), the minimum thickness (d) of the first birefringent element is 18 mm. With a total thickness of 7d (d+2d+4d), this is equal to 126 mm. The total minimum optical path length is then on the order of about 130 mm with all other components inserted into the device. This long coupling distance will cause large insertion loss and is difficult to manufacture. Although this problem can be resolved through the use of right angle prism that deflects the light at the output, this approach further increases the cost and complexity of the device. The use of a PBS or angled beam separator can relax this coupling restraint because the output angle further separates the optical paths so that the geometric increase in the size of the angled beam separator is no longer required. The result is a more compact switch having a smaller loss.

Figure 9:
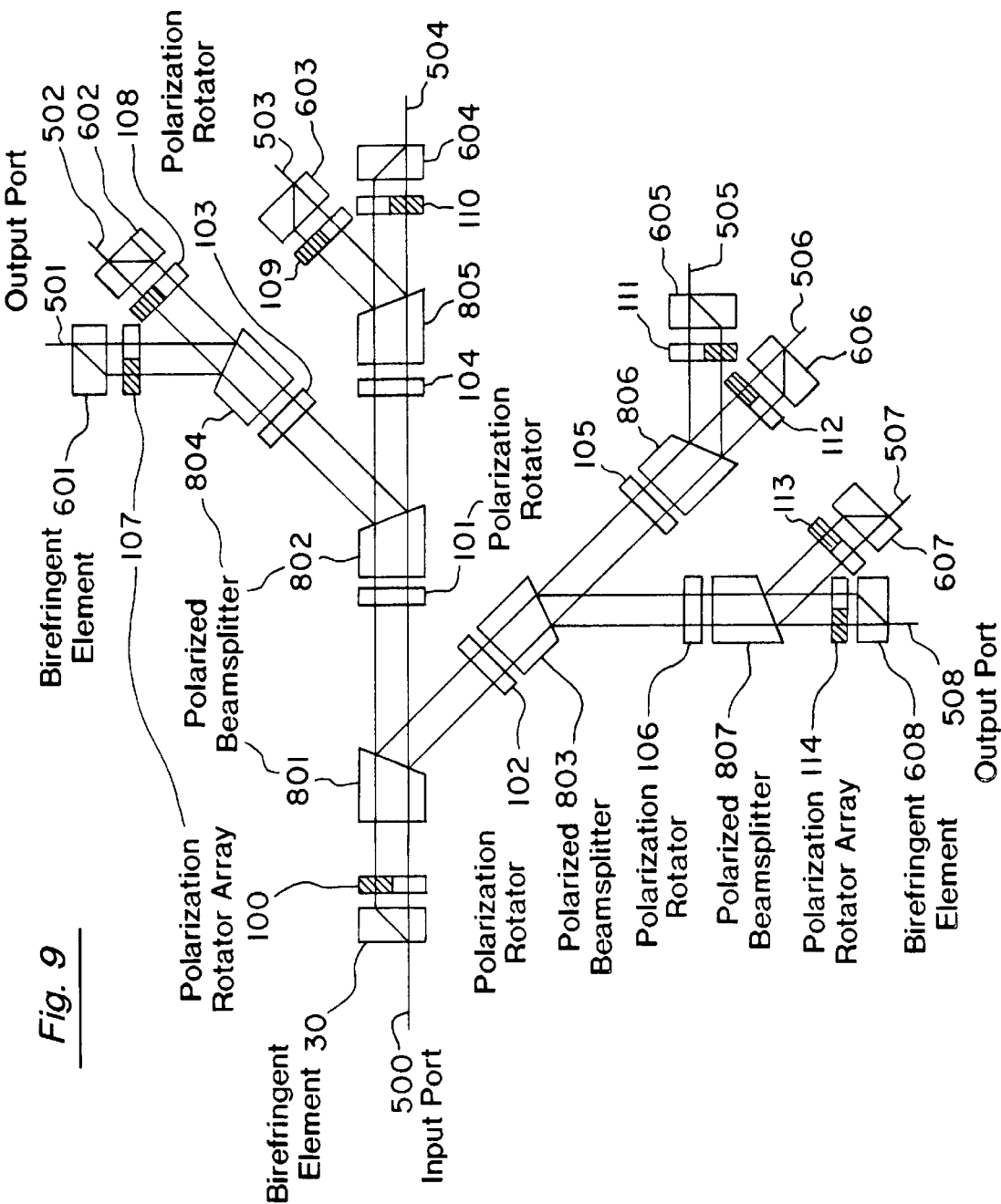
FIG. 9 is a diagram of another embodiment of a 1×8 routing switch using a tree structure of angled polarized beamsplitters.

FIG. 9 is an example of a 1×8 optical routing switch using a network of 1×2 switching stages forming a binary tree structure. Here again, each stage consists of a polarization rotator 100, 101, 102, 103, 104, 105, 106 in combination with an angled polarization separator 801, 802, 803, 804, 805, 806, and 807. The input beam is separated into a pair of orthogonally-polarized beams by a first birefringent element 30, as in the previous embodiments. The polarization of one of these orthogonally-polarized beams is rotated by 90 degrees by the first polarization rotator array 100 so that both beams have the same polarization, as determined by the control state of the switch. The beam pair is routed through the network of 1×2 switching states based on the control states of the polarization rotators associated with each stage. It should be noted that the first polarization rotator array 100 has two pixels, while the remaining polarization rotators 102 through 106 require only a single pixel. At each output port, a final polarization rotator array 107–114 returns the beam pair to orthogonal polarizations so that they can be combined by the final birefringent element 601–608.

Figure 13:
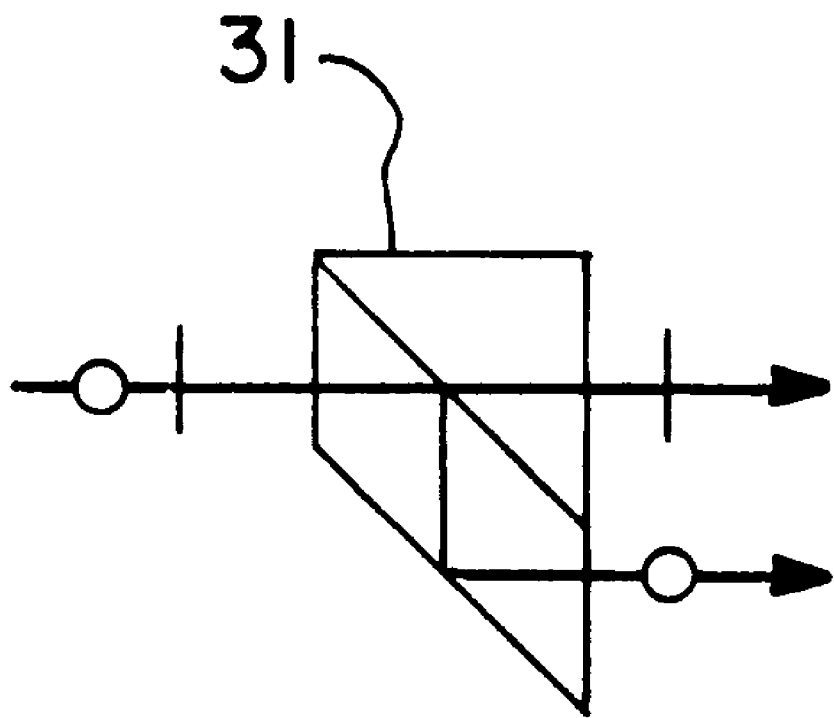
FIG. 13 is a cross-sectional diagram of an alternative embodiment of a polarization-dependent routing element combining a PBS with a reflective prism.

FIG. 13 is a cross-sectional diagram of a polarization-dependent routing element 31 that could be used in place of the birefringent elements 30 and 60 to separate the input beam into orthogonally-polarized components, or to combine the orthogonally-polarized beams at the output port. This polarization-dependent routing element 31 is a combination of a PBS with a reflective prism. The vertically-polarized component of the input beam passes directly through the element 31. However, the horizontally-polarized component of the input beam is reflected by 90 degrees within the PBS and reflected a second time by the reflective surface of the prism so that the horizontally-polarized beam emerges parallel to, but separated from the vertically-polarized beam.

N×M ROUTING SWITCH USING POLARIZED BEAMSPLITTERS.

The embodiments of the present invention depicted in FIGS. 8 through 11 are 1×N routing switches having a single input port and N output ports. This concept can be extended to create optical routing switches having an arbitrary number of input and output ports.

Figure 12:
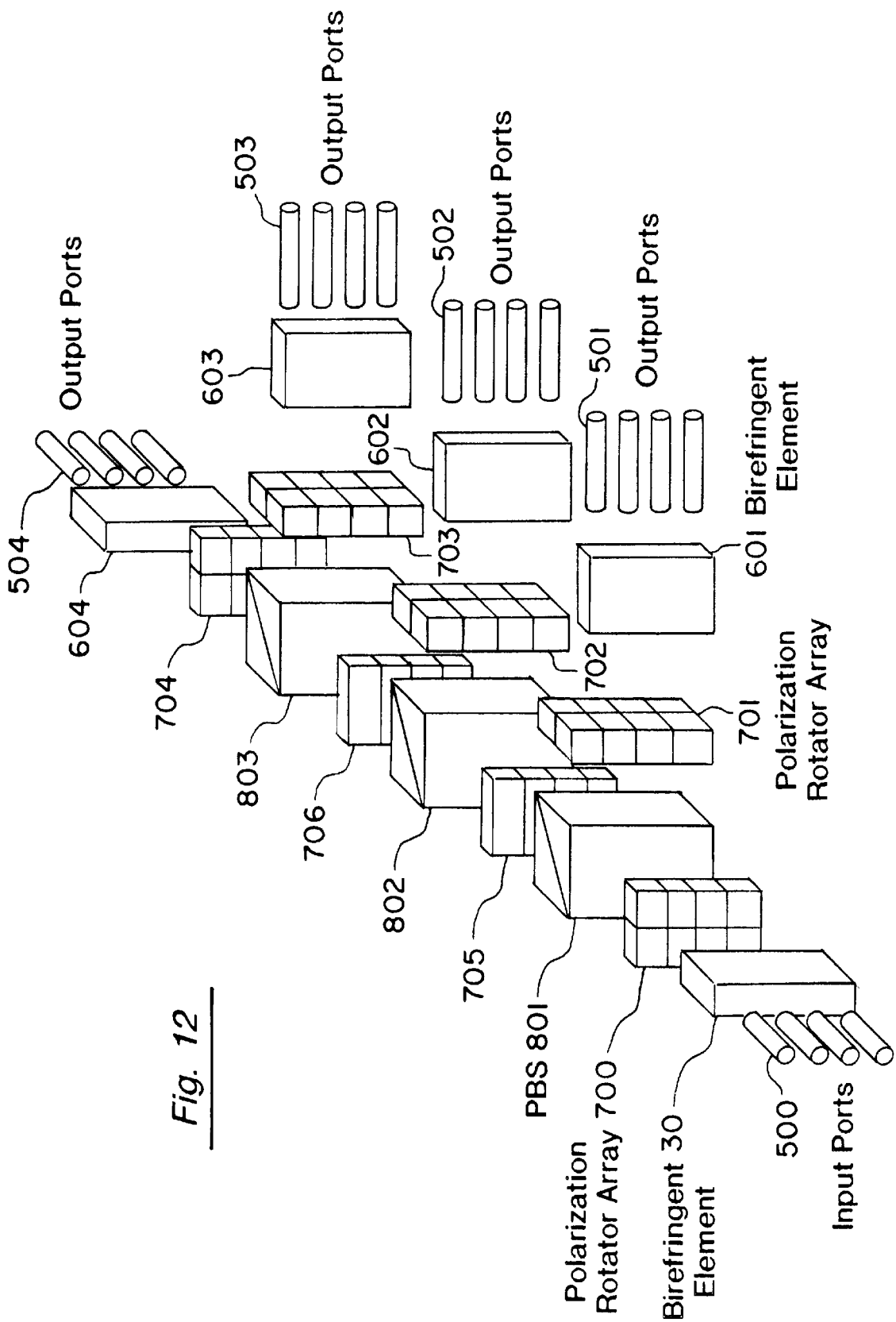
FIG. 12 is a diagram of another alternative embodiment of a series of four 1×4 routing switches stacked atop one another.

FIG. 12 illustrates an implementation in which four 1×4 switches are stacked in parallel on top of one another. In one network application using a N×N structure, a total of 2N of the 1×N modules are needed. In the 4×4 case, eight of the 1×4 switching modules are required. With the four-level architecture shown in FIG. 12, two of these devices are sufficient to construct a 4×4 crossbar switch. From the material cost perspective, because the optical components in the switch are the same except for increased size in one dimension, material costs remain virtually unchanged. This rapidly decreases the average material cost per level as the number of levels increases.

Figure 14:
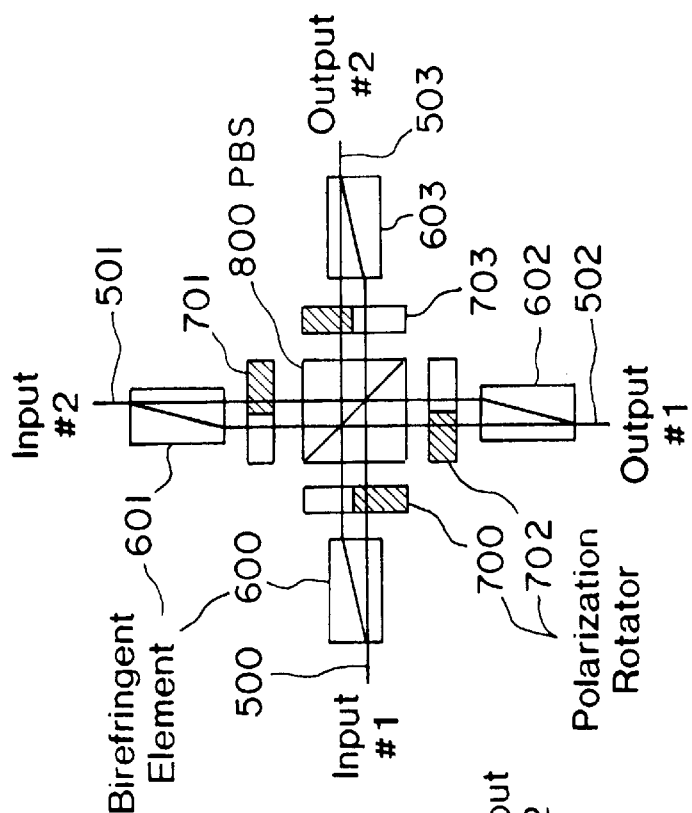
FIG. 14 is a cross-sectional diagram of a 2×2 routing switch using a polarized beamsplitter.

FIG. 14 is a cross-sectional diagram of an alternative embodiment of a 2×2 routing switch using a single PBS 800. Both input ports 500, 501 include a birefringent element 600, 601 that spatially separates the input beam into a pair of orthogonally-polarized beams. The polarization rotator arrays 700 and 701 rotate the polarization of at least one of the beams so that both beams are either horizontally or vertically polarized, determined by the control state of the switch. Depending on their polarization, the beams either pass directly through the PBS to the opposing output port 502 or 503, or are reflected by 90° to the other output port 503 or 502. Both output ports 502, 503 include a polarization rotator array 702, 703 that returns the beam pair to orthogonal polarizations. A final birefringent element 602, 603 combines the orthogonally-polarized pair of beams at the output port 502, 503.

Figure 15:
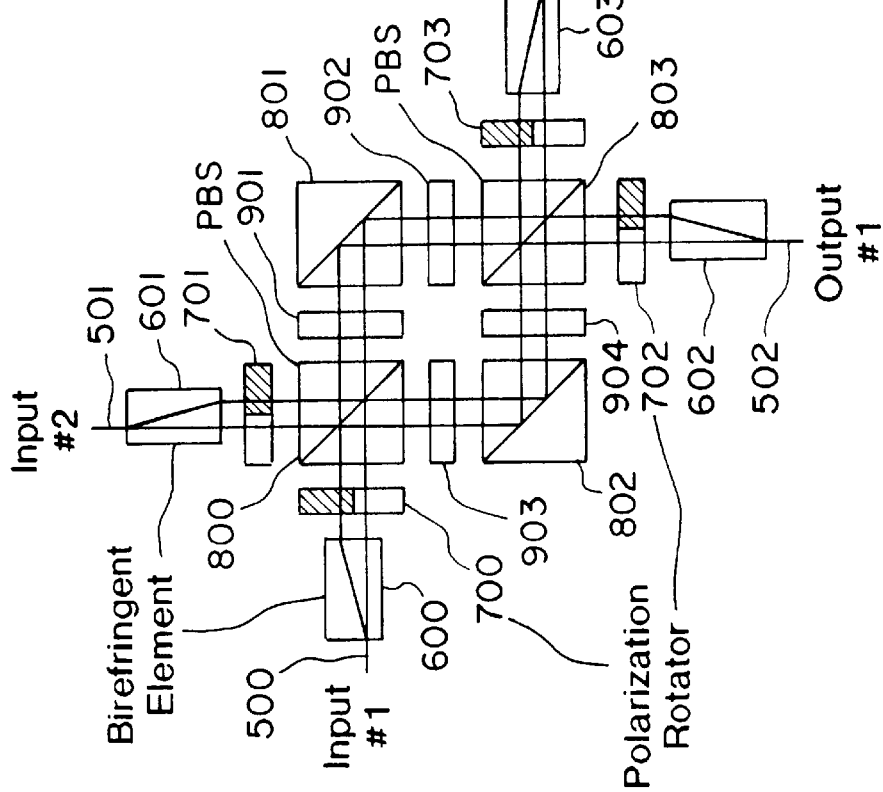
FIG. 15 is a cross-sectional diagram of an alternative embodiment of a 2×2 routing switch using a network of polarized beamsplitters.

FIG. 15 is a cross-sectional diagram of an alternative embodiment of a 2×2 routing switch that extends the basic concept of the embodiment depicted in FIG. 14 to a two-dimensional network of polarized beamsplitters 800, 801, 802, and 803. Each of the polarizers 901, 902, 903 and 904 can be externally controlled in accordance with the control state of the switch to adjust the polarization of the beam pair entering the polarized beamsplitters 801, 802, and 803. The polarization of the beam pair entering the initial PBS 800 is controlled by the polarization rotator arrays 700 and 701. As before, both output ports 502, 502 include a polarization rotator array 702, 703 that returns the beam pair to orthogonal polarizations, and a final birefringent element 602, 603 that combines the orthogonally-polarized pair of beams at the output port 502, 503.

Figure 16:
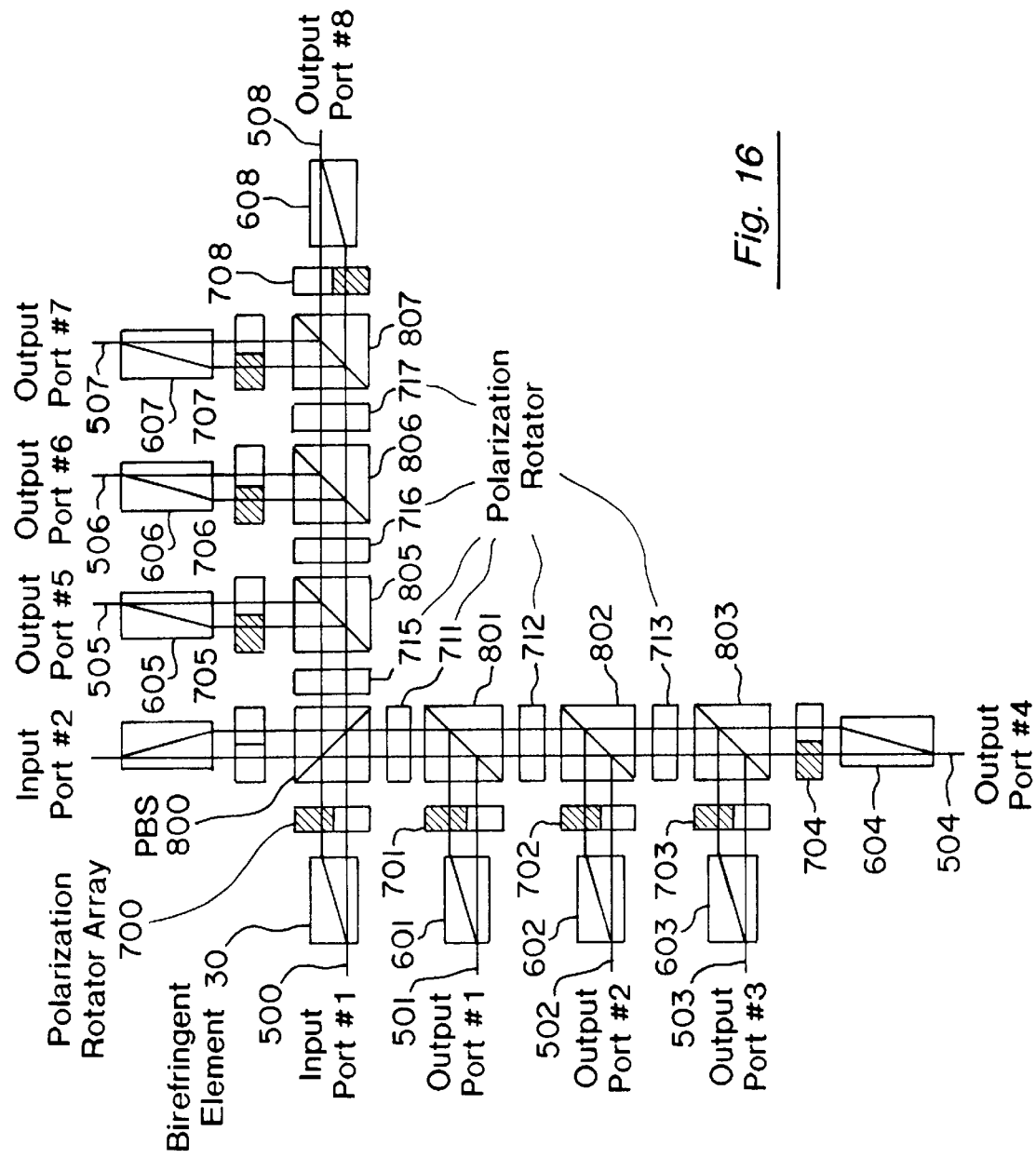
FIG. 16 is a cross-sectional diagram of a 2×8 routing switch using polarized beamsplitters.

FIG. 16 is a cross-sectional diagram of a 2×8 routing switch using multiple polarized beamsplitters 800 through 807 in a series architecture similar to the 1×8 routing switch shown in FIG. 10. A second input port has been added to the initial PBS 800, which functions in the same manner as the embodiments shown in FIGS. 14 and 15.

Figure 17:
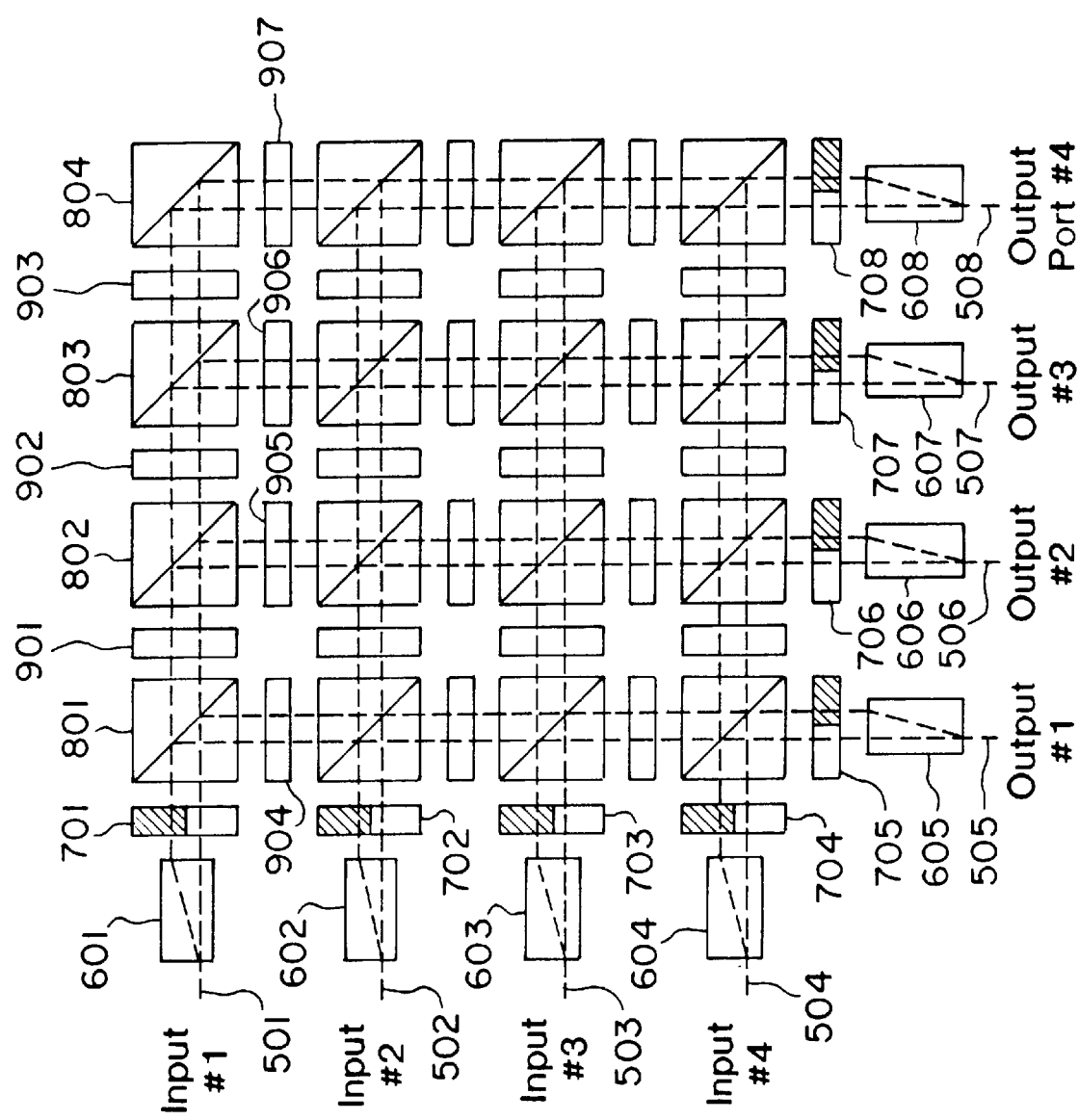
FIG. 17 is a cross-sectional diagram of a 4×4 routing switch.

FIG. 17 is a cross-sectional diagram of a 4×4 routing switch using a two-dimensional network or array of 16 polarized beamsplitters 801, 802, 803, etc. As before, each of the input ports 501 through 504 includes a birefringent element 601–604 that spatially separates the input beam into a pair of orthogonally-polarized beams, and a polarization rotator array 701–704 that rotates the polarization of at least one of the beams so that both beams are either horizontally or vertically polarized, determined by the control state of the switch. The beam pair then enters the network of polarized beamsplitters, where they are routed to the desired output port 505–508 by controlling the states of the appropriate polarization rotator arrays 701–704 and polarizers 901, 902, 903, etc., associated with each of the polarized beamsplitters 801, 802, 803, etc. Each output port includes a polarization rotator array 705–708 that returns the beam pair to orthogonal polarizations, and a final birefringent element 602, 603 that combines the orthogonally-polarized pair of beams at the output port.

Figure 18:
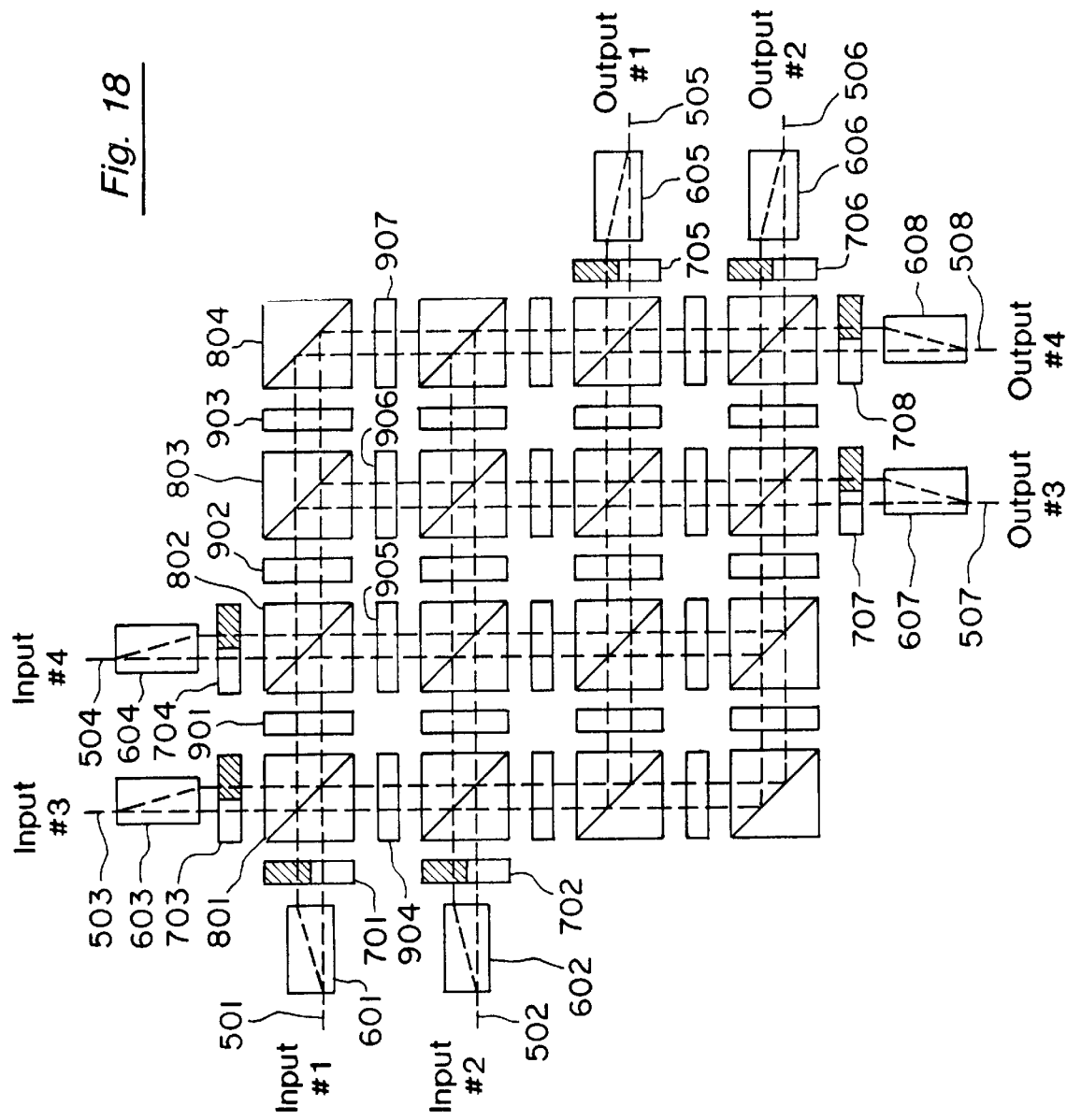
FIG. 18 is a cross-sectional diagram of an alternative embodiment of a 4×4 routing switch.

FIG. 18 is a cross-sectional diagram of an alternative embodiment of a 4×4 routing switch. The locations of the four input ports 501 through 504 and the output ports 505 through 508 have been shifted relative to the 4×4 network of polarized beamsplitters 801, 802, 803, etc. However, the functionality of this embodiment is essentially the same as the 4×4 routing switch shown in FIG. 17.

Figure 19:
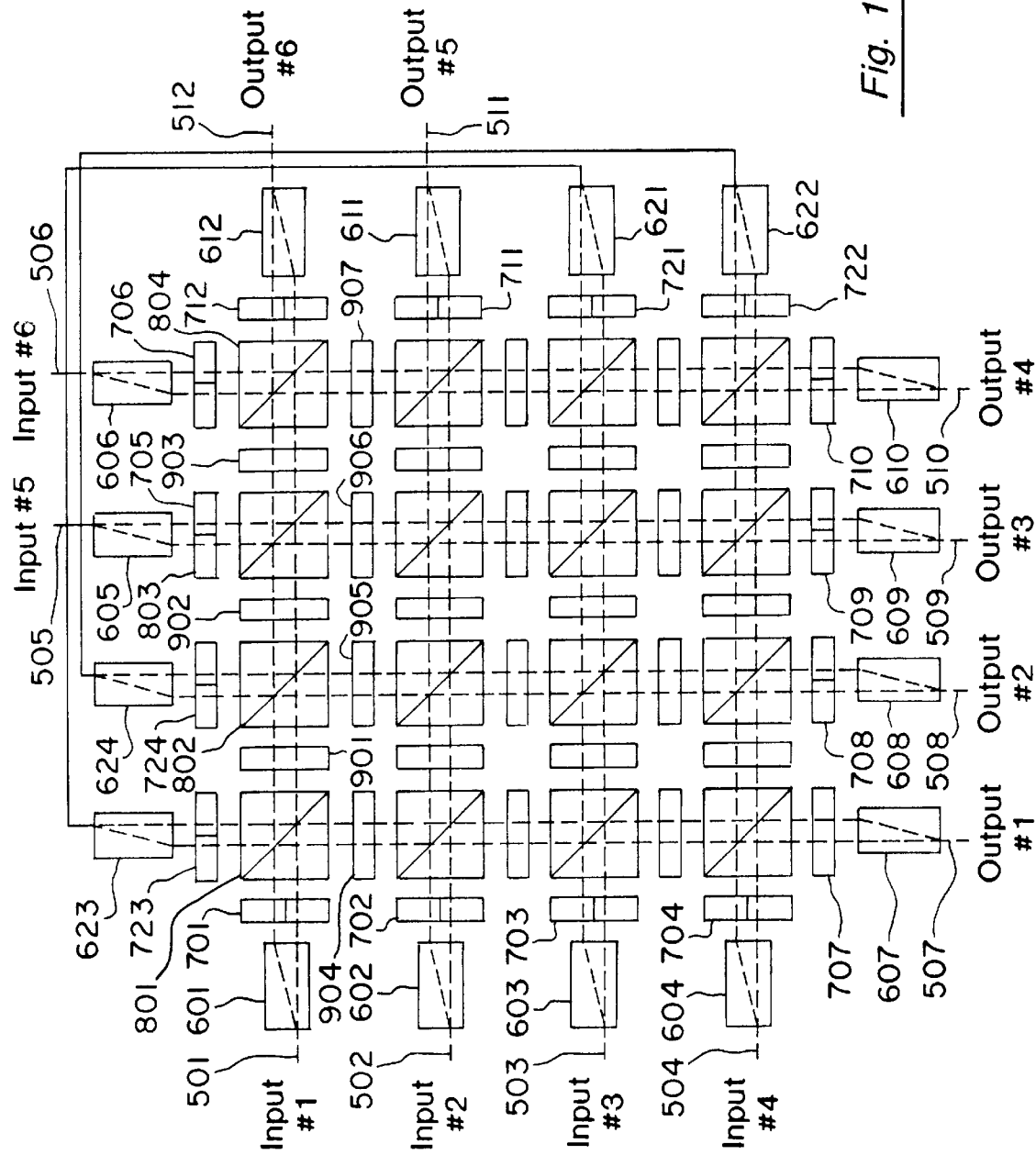
FIG. 19 is a cross-sectional diagram of a 6×6 routing switch.

FIG. 19 is a cross-sectional diagram of a 6×6 routing switch using a 4×4 network of polarized beamsplitters 801, 802, 803, etc. A 4×4 array of polarized beamsplitters could support up to a maximum of 16 input/output ports. However, isolation and overlap of the beam paths become problems as the number of input/output ports increases. This embodiment uses all 16 ports, but the beams exiting at two of the ports (see birefringent elements 621 and 622) are routed as inputs to two other ports (see birefringent elements 623 and 624) and can then be directed to any of the output ports 507 through 512, as previously discussed. This configuration helps to reduce the number of PBSs and polarizers, and thereby reduces manufacturing costs.

FIGS. 20a and 20b are diagrams of the two control states of an alternative embodiment of a 2×2 routing switch that uses a 2×2 network of PBSs 801, 802, 803, and 804. Both of the input ports include a birefringent element 601, 602 that spatially separates the input beam into a pair of orthogonally-polarized beams, and a polarization rotator array 701, 702 that rotates the polarization of at least one of the beams so that both beams are either horizontally or vertically polarized, determined by the control state of the switch. The beam pair then enters the network of PBSs 801–804, where they are routed to the desired output port. Both of the output ports include a polarization rotator array 703, 704 that returns the beam pair to orthogonal polarizations, and a final birefringent element 603, 604 that combines the orthogonally-polarized pair of beams at the output port. FIG. 20a illustrates the first control state of the routing switch wherein the polarization rotator arrays 701 and 702 associated with the both input ports change the polarization of the input beam pairs so that they pass directly through PBSs 801 and 802. In contrast, FIG. 20b illustrate the second control state in which the polarization rotator arrays 701 and 702 change the polarization of the beam pairs so that they are reflected by 90° within PBSs 801 and 802. The beam pairs are also reflected by 90° within PBSs 804 and 803 to route the beam pair to the opposite set of output ports from those shown in FIG. 20a.

Figure 21:
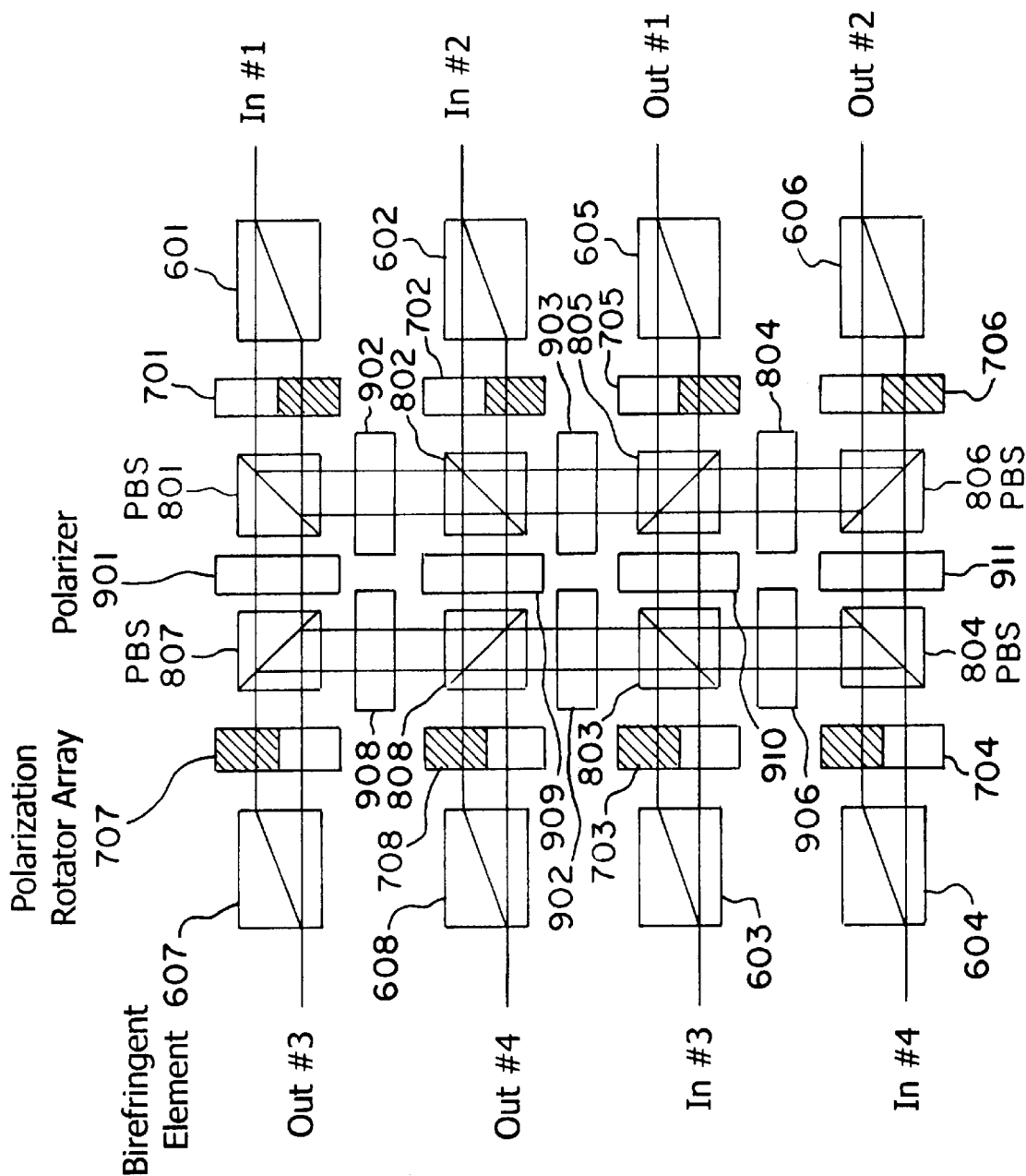
FIG. 21 is a diagram of an alternative embodiment of a 4×4 routing switch.

FIG. 21 is a diagram of an alternative embodiment of a 4×4 routing switch employing a network of PBSs 801–808 and polarizers 901–911 to route the beam pairs from each input port to the desired output ports. As before, each of the input ports includes a birefringent element 601–604 that spatially separates the input beam into a pair of orthogonally-polarized beams, and a polarization rotator array 701–704 that rotates the polarization of at least one of the beams so that both beams are either horizontally or vertically polarized, determined by the control state of the switch. The beam pair from each input port then enters the network of PBSs 801–808 and polarizers 901–911, where they are routed to the desired output port 508 by controlling the states of the appropriate polarization rotator arrays 701–704 and polarizers 901–911. Each output port includes a polarization rotator array 705–708 that returns the beam pair to orthogonal polarizations, and a final birefringent element 605–608 that combines the orthogonally-polarized pair of beams at the output port.

N×M ROUTING SWITCH USING RIGHT-ANGLE PRISMS.

FIGS. 22a and 22b are two side views and FIGS. 22c and 22d are two top views of the two control states of an alternative embodiment of a 2×2 routing switch using a pair of right-angle prisms 223 and 224. In the first control state illustrated in FIGS. 22a and 22c, the input beam from input port 501 is routed to output port 500, and the input beam from input port 502 is routed to output port 503. In the second control state shown in FIGS. 22b and 22d, the input beam from input port 501 is routed to output port 503, and the input beam from input port 502 is routed to output port

500. Here again, birefringent elements 30, 60 are associated with the input ports 501, 502 and output ports 503, 504. These birefringent elements 30, 60 spatially separate the input beam from either input port into a pair of orthogonally-polarized beams. A polarization rotator array 221 or 226 rotates the polarization of at least one of the beams so that both beams are either horizontally or vertically polarized, determined by the control state of the switch. The beam pair then enters a second birefringent element 222 or 225, which either allows the beam pair to pass directly through the second birefringent element 222, 225 in the same horizontal plane (as shown in FIGS. 22a and 22c), or directs the beam pair upward to a second vertical plane (as shown in FIGS. 22b and 22d), based on the polarization of the beam pair.

In the first control state depicted in FIGS. 22a and 22c, the beam pair is reflected twice within a right-angle prism 223 or 224, as shown in FIG. 22c, and thereby directed back toward the adjacent output port 500 or 503. The polarization rotator array 220 or 227 associated with each output port 500 or 503 returns the beam pair to orthogonal polarizations, and birefringent element 30 or 60 combines the orthogonally-polarized pair of beams at the output port.

In the second control state shown in FIGS. 22b and 22d, the second birefringent element 222 or 225 directs the beam pair upward to a second vertical plane so that they pass above the prisms 223 and 224 directly to the second birefringent element 222 or 225 on the opposite side of the device. The second birefringent element 222, 225 return the beam pair to the lower vertical plane due their polarization. As before, the polarization rotator array 220 or 227 associated with each output port 500 or 503 returns the beam pair to orthogonal polarizations, and birefringent element 30 or 60 combines the orthogonally-polarized pair of beams at the output port.

The present invention has the advantages of: (1) polarization-independent operation; (2) low inter-channel crosstalk; (3) low insertion loss; (4) operation over a broad ranges of wavelengths; (5) a wide range of operating temperatures; (6) switching speeds varying from milliseconds to nanoseconds when using different polarization converters; and (7) a scaleable structure (M×N) that allows multiple switches to be stacked together. These switch structures are best implemented with liquid-crystal polarization rotators, because of their spatial light modulation characteristics. In such a case, pixelized modulators can be used to control the beam pair at each stage. A large matrix can be fabricated into one structure that results in a large-scale N×M optical routing switch.

The above disclosure sets forth a number of embodiments of the present invention. Other arrangements or embodiments, not precisely set forth, could be practiced under the teachings of the present invention and as set forth in the following claims.

We claim:

1. An N×M optical routing switch directing an input beam at any of a plurality of input ports to any of a plurality of output ports determined by a specified control state, said switch comprising:

a plurality of input ports receiving an input beam, each input port having:
   (a) an input polarization-dependent routing element separating said input beam into a pair of orthogonally-polarized beams; and
   (b) an input polarization rotator selectively rotating the polarization of at least one of said beam pair so that both beams have the same polarization determined by said control state; and a network of polarized beamsplitters receiving said beam pair exiting said input ports, said network of polarized beamsplitters having a polarization rotator between adjacent polarized beamsplitters selectively rotating the polarization of said beam pair to route said beam pair along any of a plurality of optical paths through said network of polarized beamsplitters determined by said control state; and a plurality of output ports selectively receiving said beam pair exiting said network of polarized beamsplitters, each output port having:
   (a) an output polarization rotator rotating the polarization of said beam pair exiting said network of polarized beamsplitters so that said beams are orthogonally polarized; and
   (b) an output polarization-dependent routing element combining said orthogonally-polarized beams at said output port.

2. The optical routing switch of claim 1 wherein said input polarization-dependent routing element comprises a birefringent element.

3. The optical routing switch of claim 1 wherein said output polarization-dependent routing element comprises a birefringent element.

4. The optical routing switch of claim 1 wherein said network of polarized beamsplitters comprises a two-dimensional array of polarized beamsplitters.

5. The optical routing switch of claim 1 wherein said network of polarized beamsplitters comprises a serial array of polarized beamsplitters.

6. The optical routing switch of claim 1 wherein said input polarization rotator comprises a liquid crystal polarization rotator having multiple pixels.

7. The optical routing switch of claim 1 wherein at least one of said polarization rotators in said network of polarized beamsplitters comprise a liquid crystal polarization rotator.

* * * * *

UNITED STATES PATENT AND TRADEMARK OFFICE
CERTIFICATE OF CORRECTION

Page 1 of 1

PATENT NO. : 6,049,404
DATED : April 11, 2000
INVENTOR(S) : Wu et al.

It is certified that error appears in the above-identified patent and that said Letters Patent is hereby corrected as shown below:

Title page item [54]
Column 1,
Line 1, replace "N+M DIGITALLY PROGRAMMABLE" WITH -- NxM DIGITALLY PROGRAMMABLE--.
Line 2, please insert heading, "Government Interests"

As a separate paragraph, after the heading, please the insert the following, "The invention was made with Government support under Contract BMDO I: DASG60-97-M-0081 awarded by U.S. Army Space & Missile Defense Command, CONTR & ACQ OFC/SMDC-CM-CK, PO Box 1500, Huntsville, AL 35807. The Government has certain rights in the invention."

Signed and Sealed this

Tenth Day of July, 2001

*Nicholas P. Godici*

*Attest:*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,049,404
DATED         : April 11, 2000
INVENTOR(S)   : Wu et al.

It is certified that error appears in the above-identified patent and that said Letters Patent is hereby corrected as shown below:

Title page item [54]
Column 1,
Line 1, replace "N+M DIGITALLY PROGRAMMABLE" WITH -- NxM DIGITALLY PROGRAMMABLE--.
Line 2, please insert heading, "Government Interests"

As a separate paragraph, after the heading, please the insert the following,
"The invention was made with Government support under Contract BMDO I: DASG60-97-M-0081 awarded by U.S. Army Space & Missile Defense Command, CONTR & ACQ OFC/SMDC-CM-CK, PO Box 1500, Huntsville, AL 35807. The Government has certain rights in the invention."

Signed and Sealed this

Twenty-seventh Day of November, 2001

Attest:

NICHOLAS P. GODICI
*Attesting Officer*     *Acting Director of the United States Patent and Trademark Office*